(12) United States Patent
Ito

(10) Patent No.: US 8,773,519 B2
(45) Date of Patent: Jul. 8, 2014

(54) IMAGE DISPLAY APPARATUS, GLASSES FOR IMAGE OBSERVATION, IMAGE DISPLAY CONTROL METHOD, AND PROGRAM

(75) Inventor: Atsushi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 13/002,835

(22) PCT Filed: Apr. 6, 2010

(86) PCT No.: PCT/JP2010/056202
§ 371 (c)(1),
(2), (4) Date: Jan. 6, 2011

(87) PCT Pub. No.: WO2010/137406
PCT Pub. Date: Dec. 2, 2010

(65) Prior Publication Data
US 2012/0057003 A1    Mar. 8, 2012

(30) Foreign Application Priority Data
May 26, 2009   (JP) ................. P2009-126938

(51) Int. Cl.
*H04N 13/04*    (2006.01)
(52) U.S. Cl.
CPC ............ *H04N 13/0438* (2013.01); *H04N 13/04* (2013.01)
USPC ..................... 348/56; 345/6; 345/4
(58) Field of Classification Search
CPC .............. A63F 13/02; A63F 2300/308; G02B 27/0093; G02B 27/2264; G02B 27/26; G02F 1/1334; G02F 2001/133538; G03B 21/132; G03B 21/30; G06F 21/84; G06F 3/011; G06F 3/041; G06F 3/0412; G06F 3/0414; G06F 3/0488; G06K 15/00; G06K 15/22; G06K 2215/0082; G09G 2310/0235; G09G 2320/0247; G09G 2340/12; G09G 2358/00; G09G 3/001; G09G 3/20; G09G 3/3629; G09G 5/00; G09G 5/006; G09G 5/02; G09G 5/06; G09G 5/14; H04N 13/00; H04N 13/0025; H04N 13/0037; H04N 13/004; H04N 13/0048; H04N 13/0051; H04N 13/0055; H04N 13/0059; H04N 13/0203; H04N 13/0217; H04N 13/0239; H04N 13/0242; H04N 13/0246; H04N 13/0257; H04N 13/0275; H04N 13/0278; H04N 13/0285; H04N 13/0289; H04N 13/0296; H04N 13/0422; H04N 13/0425; H04N 13/0431; H04N 13/0434; H04N 13/0438; H04N 13/044; H04N 13/0454; H04N 13/0456; H04N 13/0459; H04N 13/047; H04N 13/0475; H04N 13/0477; H04N 13/0481; H04N 13/0484; H04N 13/0497; H04N 19/00769; H04N 21/2347; H04N 21/4405; H04N 21/4408; H04N 2213/008; H04N 5/7441; H04N 5/7491; H04N 7/1675; H04N 9/3141
USPC ....................... 345/4, 5, 581, 6, 7, 8
See application file for complete search history.

(56) References Cited

U.S. PATENT DOCUMENTS 5,821,989 A * 10/1998 Lazzaro et al. ................. 348/56
2003/0118183 A1* 6/2003 Struyk .......................... 380/213
2008/0158095 A1* 7/2008 Neidrich et al. ................. 345/6

FOREIGN PATENT DOCUMENTS

JP    2006-186510    7/2006

OTHER PUBLICATIONS

English-language translation of International Search Report from the Japanese Patent Office for International Application No. PCT/JP2010/056202, mailing date Jun. 22, 2010.

*Primary Examiner* — Sath V Perungavoor
*Assistant Examiner* — Dakshesh Parikh

(74) *Attorney, Agent, or Firm* — Finnegan, Henderson, Farabow, Garrett & Dunner, L.L.P.

(57) ABSTRACT

A normal three-dimensional image is presented to a person who is wearing glasses for three-dimensional image observation, and additional information including a message, disturbance information, or the like is presented to a person who is not wearing glasses for three-dimensional image observation. An image display apparatus displays, on a display unit, an image frame sequence in which additional information image frame including additional information is added between an image frame for the left eye and an image frame for the right eye. At a display timing of the additional information image frame for the display unit, the image display apparatus outputs a control signal that sets shutters for both the left and right eyes of glasses for three-dimensional image observation worn by an observer to a closed state. With this configuration, an observer who is wearing glasses for three-dimensional image observation can observe a normal three-dimensional image, and a person who is not wearing the glasses can observe additional information such as a message prompting the person to wear the glasses.

14 Claims, 23 Drawing Sheets

FIG. 19

| CONTROL SIGNAL | STATE OF SHUTTER FOR LEFT EYE | STATE OF SHUTTER FOR RIGHT EYE |
| --- | --- | --- |
| 00 | CLOSED | CLOSED |
| 01 | OPEN | CLOSED |
| 10 | CLOSED | OPEN |
| 11 | OPEN | OPEN |

FIG. 23
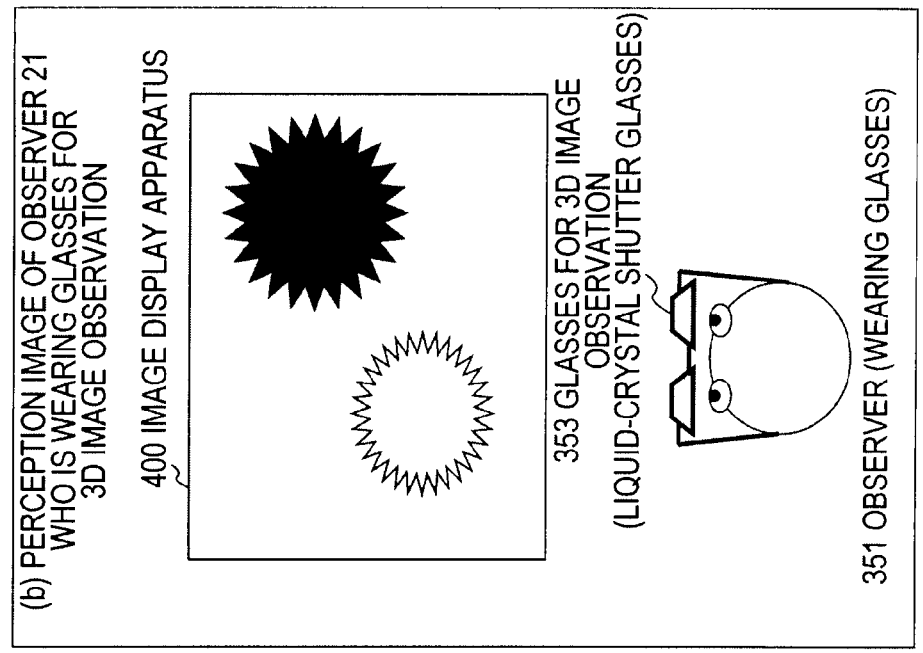
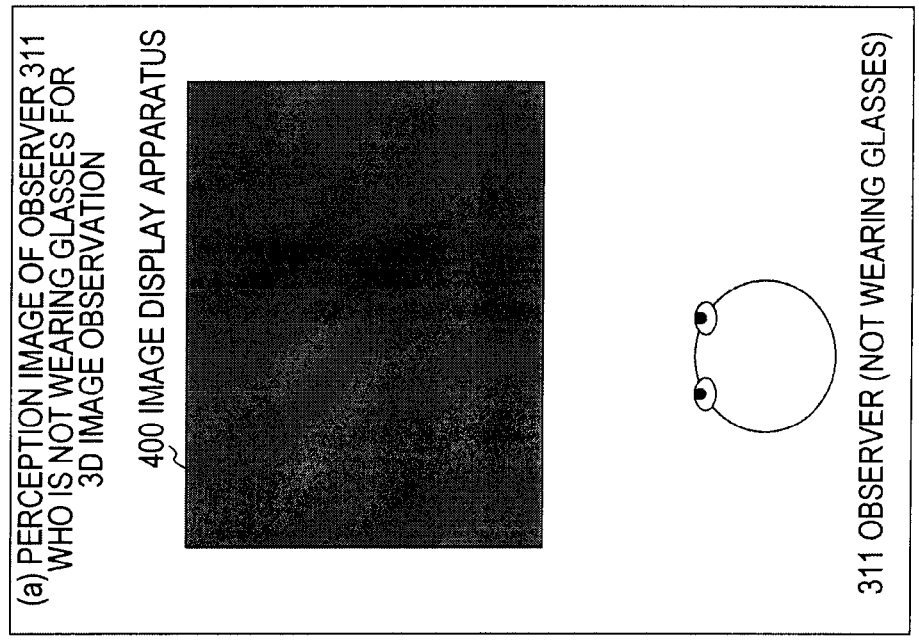

IMAGE DISPLAY APPARATUS, GLASSES FOR IMAGE OBSERVATION, IMAGE DISPLAY CONTROL METHOD, AND PROGRAM

TECHNICAL FIELD

The present invention relates to an image display apparatus, glasses for image observation, an image display control method, and a program. More particularly, the present invention relates to an image display apparatus, glasses for image observation, an image display control method, and a program for performing display and observation of, for example, a three-dimensional (3D: 3 Dimension) video image.

Background Art

In recent years, various techniques for displaying and appreciating a display image such as a screen at a movie theater or the like or a display of a TV as a three-dimensional video image, that is, a 3D (3-Dimension) video image, have been developed.

Also, the development of 2D/3D conversion techniques for generating a pseudo stereoscopic video image (3D) from a normal two-dimensional video image (2D) has been advancing. The 2D/3D conversion techniques are described in, for example, Patent Literature 1 (Japanese Unexamined Patent Application Publication No. 2006-186510) and the like. As above, the environment where a 3D video image is appreciated is being created also for living rooms.

As representative methods of a system for displaying a 3D video image and appreciating this, there are a polarization method (passive stereo method) and a time-division method (active stereo method).

The polarization method (passive stereo method) is a method of separating images for the left and right eyes by causing, with the use of a polarization filter, only light that vibrates in a specific direction to pass, and allowing the left and right eyes of an observer to observe the images for the left eye and the right eye.

This method is as follows. Before output light that constitutes a display image of an image display apparatus reaches the eyes of the observer, the light is separated via the polarization filter into that for the left eye and that for the right eye. For example, when the observer wears polarization glasses, the image light for the left eye is not input to the right eye, but is input only to the left eye, and the image light for the right eye is not input to the left eye, but is input only to the right eye. In this manner, the individual images for the left eye and the right eye are input to the left and right eyes of the observer, thereby realizing stereovision.

In contrast, the time-division method (active stereo method) is a method of realizing separation of left and right images by using shutter-type glasses synchronized with a frame switching timing of an image display apparatus.

This is the mechanism in which the image display apparatus switches and displays images for the left and right eyes on a frame-by-frame basis, and the shutter-type glasses worn by an observer hides the right eye when the image for the left eye is being displayed and hides the left eye when the image for the right eye is being displayed.

In both of these methods, special glasses for stereovision are worn to observe images. Individual images corresponding to the left and right eyes, which are displayed on an image display apparatus, are allowed to be observed by the left and right eyes, respectively, through special glasses worn by a user, thereby realizing stereovision.

However, the passive stereo method and the active stereo method have the following problems.

The problem of the passive stereo method is the point that the image display apparatus must have some type of a polarization mechanism. For example, a television apparatus that performs 3D display of broadcasting content uses a display where a polarization layer different for each scanning line is set. Such settings of the polarization layers may have adverse effects on the image quality of 2D video images that are usually seen.

Also, in this case, for every scanning line, it is necessary to display different images for the left and right eyes. As a result, there is a problem that only an image with half the resolution of the resolution in the vertical direction of the display can be provided.

Also, when the passive stereo method is adopted in a screen display image in a theater environment such as at a movie theater, a silver screen or the like that has been specially processed with high directivity must be used in order to maintain polarization. This leads to a problem of an increase in the cost.

In contrast, as the problem of the active stereo method, there is a following problem.

In the active stereo method, it is necessary for an image display apparatus to switch and display images for the left and right eyes on a frame-by-frame basis. However, when such display is performed, if the refresh rate of the image display apparatus is low, a flicker phenomenon (flicker of a screen) occurs. There is a problem that, when appreciation is performed for a long time in a state where flicker is occurring, the fatigue of the eyes and brain is felt strongly.

CITATION LIST

Patent Literature

PTL 1: Japanese Unexamined Patent Application Publication No. 2006-186510

SUMMARY OF INVENTION

Technical Problem

As described above, the development of 3D video image display systems has been advancing in recent years, and the use of 3D display systems has been widely spreading at a fast rate, such as in theaters including movie theaters and the like and in the living rooms of homes.

However, when, for example, broadcasting content in accordance with the time-division method (active stereo method) is to be provided using a television, it is required to prompt a user to wear glasses for 3D image observation. For example, at the start time of 3D video content, a process such as notifying a viewer of the start of broadcasting of the 3D video content is necessary.

However, when, for example, the viewer switches on the television after broadcasting of the 3D video content is started, it is difficult for the viewer to determine whether the video image being displayed on the television is a 3D video image. The fact that content currently being broadcast is a 3D video image may be displayed as occasion calls using, for example, text superimposed on the screen. However, the viewer who is already wearing the glasses feels that such text is bothersome.

The present invention has been made in view of, for example, such circumstances, and, in a 3D image display system using a time-division method (active stereo method), additional information such as a message or a video image to be displayed on an image display apparatus is not shown to an observer who is wearing glasses for 3D image observation, and the observer can appreciate normal 3D content.

An observer who is not wearing glasses for 3D image observation can see and recognize additional information such as a message prompting the observer to wear the glasses.

The present invention provides an image display apparatus, glasses for image observation, an image display control method, and a program that realize such information presentation.

Solution to Problem

A first aspect of the present invention resides in an image display apparatus including:

an image output control unit that generates or receives an image frame sequence in which an additional information image frame including additional information is added between an image frame for a left eye and an image frame for a right eye, and that outputs the image frame sequence to a display unit;

the display unit which displays the image frame sequence output by the image output control unit; and a control signal output unit that outputs a control signal for opening/closing shutters for the left and right eyes of glasses for three-dimensional image observation worn by an observer, wherein the control signal output unit outputs a control signal that sets the shutters for both the left and right eyes to a closed state at a display timing of the additional information image frame for the display unit.

Further, in an embodiment of the image display apparatus of the present invention, the control signal output unit outputs a control signal that sets only the shutter for the left eye to an open state at a display timing of the image frame for the left eye for the display unit, and outputs a control signal that sets only the shutter for the right eye to an open state at a display timing of the image frame for the right eye for the display unit.

Further, in an embodiment of the image display apparatus of the present invention, the control signal output unit outputs a control signal that sets the shutters for both the left and right eyes to a closed state prior to a display start time of the additional information image frame for the display unit, and outputs a control signal that sets only the shutter for one of the left and right eyes to a closed state prior to a display end time of the additional information image frame for the display unit.

Further, in an embodiment of the image display apparatus of the present invention, the control signal output unit outputs a control signal that sets only the shutter for one of the left and right eyes to a closed state upon completion of a display transition period from the additional information image frame for the display unit to the next display frame.

Further, in an embodiment of the image display apparatus of the present invention, the image output control unit generates or receives an image frame sequence in which a display period of a plurality of image frames for the left eye including the same image and a display period of a plurality of image frames for the right eye including the same image are set to be longer than a display period of the additional information image frame, and outputs the image frame sequence to the display unit.

Further, in an embodiment of the image display apparatus of the present invention, the additional information image frame is a multiplexed information image frame in which the additional information is added to an image constituting the image frame for the left eye or the image frame for the right eye, and the control signal output unit controls an output timing of a control signal, in accordance with an additional information setting position of the multiplexed information image frame, so that the additional information is not input to any of the left and right eyes of the observer via the glasses for three-dimensional image observation.

Further, in an embodiment of the image display apparatus of the present invention, the additional information image frame is an image frame including a message prompting a person to wear glasses for three-dimensional image observation.

Further, in an embodiment of the image display apparatus of the present invention, the additional information image frame is an inverted image frame of the image frame for the left eye or the image frame for the right eye.

Further, in an embodiment of the image display apparatus of the present invention, the additional information image frame is an image frame including disturbance information for the image frame for the left eye or the image frame for the right eye.

Further, in an embodiment of the image display apparatus of the present invention, the image frame for the left eye and the image frame for the right eye are image frames including a two-dimensional image, and the control signal output unit outputs a control signal that sets the shutters for both the left and right eyes to an open state at a display timing of the image frame for the left eye or the image frame for the right eye for the display unit.

Further, a second aspect of the present invention resides in glasses for image observation, including:

a control signal receiving unit that receives a control signal from an image display apparatus;

a shutter control unit that executes an opening/closing process of shutters for left and right eyes of glasses for three-dimensional image observation in accordance with the control signal received by the control signal receiving unit; and the shutters for the left and right eyes of the glasses for three-dimensional image observation which perform an opening/closing operation under control of the shutter control unit, wherein the control signal received by the control signal receiving unit includes a control signal that opens only one of the shutters corresponding to the left and right eyes of the glasses for three-dimensional image observation and a control signal that closes the shutters corresponding to both the left and right eyes, and wherein the shutter control unit executes a process of opening only one of the shutters corresponding to the left and right eyes of the glasses for three-dimensional image observation or a process of closing the shutters corresponding to both the left and right eyes.

Further, a third aspect of the present invention resides in an image display system including an image display apparatus and glasses for image observation, wherein the image display apparatus includes an image output control unit that generates or receives an image frame sequence in which an additional information image frame including additional information is added between an image frame for a left eye and an image frame for a right eye, and that outputs the image frame sequence to a display unit;

the display unit which displays the image frame sequence output by the image output control unit; and a control signal output unit that outputs a control signal for opening/closing shutters for the left and right eyes of glasses for three-dimensional image observation worn by an observer, wherein the control signal output unit is configured to output a control signal that sets the shutters for both the left and right eyes to a closed state at a display timing of the additional information image frame for the display unit, wherein the glasses for image observation are glasses for three-dimensional image observation, and include a control signal receiving unit that receives a control signal from the image display apparatus;

a shutter control unit that executes an opening/closing process of the shutters for the left and right eyes of the glasses for three-dimensional image observation in accordance with the control signal received by the control signal receiving unit; and the shutters for the left and right eyes of the glasses for three-dimensional image observation which perform an opening/closing operation under control of the shutter control unit, and wherein the shutter control unit is configured to execute a process of opening only one of the shutters corresponding to the left and right eyes of the glasses for three-dimensional image observation or a process of closing the shutters corresponding to both the left and right eyes.

Further, a fourth aspect of the present invention resides in an image display control method executed by an image display apparatus, including:

an image output control step of generating or receiving, by an image output control unit, an image frame sequence in which an additional information image frame including additional information is added between an image frame for a left eye and an image frame for a right eye, and outputting the image frame sequence to a display unit;

a display step of displaying, by the display unit, the image frame sequence output by the image output control unit; and a control signal output step of outputting, by a control signal output unit, a control signal for opening/closing shutters for the left and right eyes of glasses for three-dimensional image observation worn by an observer, wherein the control signal output step includes the step of outputting a control signal that sets the shutters for both the left and right eyes to a closed state at a display timing of the additional information image frame for the display unit.

Further, a fifth aspect of the present invention resides in a program that causes an image display apparatus to execute image display control, including:

an image output control step of causing an image output control unit to generate or receive an image frame sequence in which an additional information image frame including additional information is added between an image frame for a left eye and an image frame for a right eye, and to output the image frame sequence to a display unit;

a display step of causing the display unit to display the image frame sequence output by the image output control unit; and a control signal output step of causing a control signal output unit to output a control signal for opening/closing shutters for the left and right eyes of glasses for three-dimensional image observation worn by an observer, wherein the control signal output step includes the step of causing a control signal that sets the shutters for both the left and right eyes to a closed state to be output at a display timing of the additional information image frame for the display unit.

Note that the program of the present invention is, for example, a program that can be provided by a storage medium or a communication medium to be provided in a computer-readable format as to an image processing apparatus or a computer system that can execute various program codes. Providing such a program in a computer-readable format realizes processing in accordance with the program on the image processing apparatus or the computer system.

Other further objects, features, and advantages of the present invention will become apparent from more detailed description based on later-described embodiments of the present invention and attached drawings. Note that a system in the present specification is a logical group configuration of multiple devices, and is not restricted to each component device being within the same housing.

Advantageous Effects of Invention

According to an embodiment of the present invention, an image display apparatus displays, on a display unit, an image frame sequence in which additional information image frame including additional information is added between an image frame for the left eye and an image frame for the right eye. At a display timing of the additional information image frame for the display unit, the image display apparatus outputs a control signal that sets shutters for both the left and right eyes of glasses for three-dimensional image observation worn by an observer to a closed state. With this configuration, an observer who is wearing glasses for three-dimensional image observation can observe a normal three-dimensional image, and a person who is not wearing the glasses can observe additional information such as a message prompting the person to wear the glasses.

BRIEF DESCRIPTION OF DRAWINGS

FIG. 19 is a diagram describing examples of control signals output from the image display apparatus to the glasses for 3D image observation.

FIG. 23 includes diagrams describing examples of images perceived by an observer who is wearing glasses for 3D image observation and an observer who is not wearing the glasses in the embodiment of the present invention.

DESCRIPTION OF EMBODIMENTS

Figure 1:
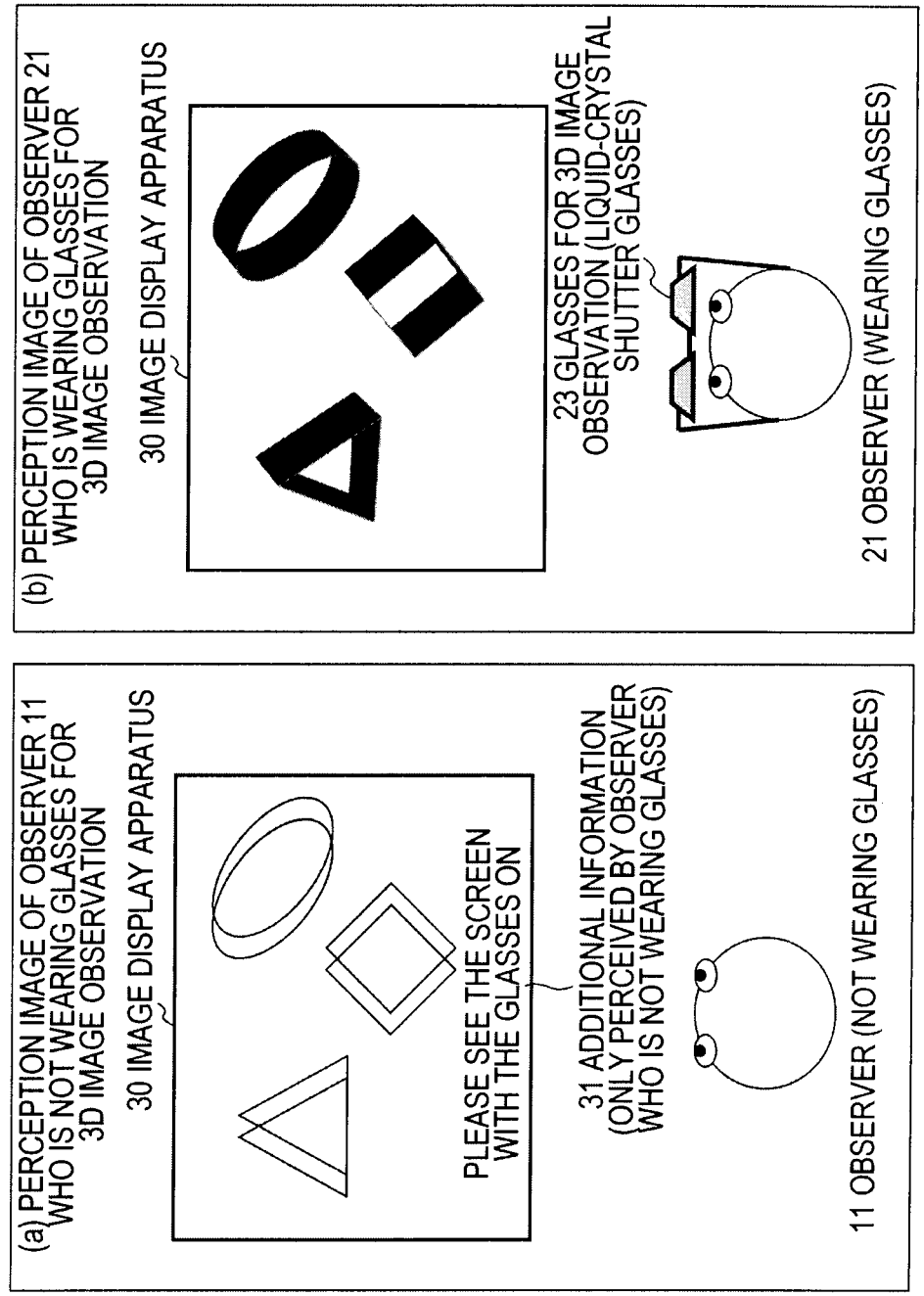
FIG. 1 includes diagrams describing examples of images perceived by an observer who is wearing glasses for 3D image observation and an observer who is not wearing the glasses in an embodiment of the present invention.

Hereinafter, details of an image display apparatus, glasses for image observation, an image display control method, and a program of the present invention will be described with reference to the drawings. The description will be given in accordance with the following sections:

1. Description of the overview of processing executed by an image display apparatus of the present invention
2. An embodiment in which additional information such as a message for wearing glasses for 3D image observation is presented to a person who is not wearing the glasses (first embodiment)
3. An embodiment in which a comfortable 3D image can be presented only to a person who is wearing shutter-type glasses for 3D image observation (second embodiment)
4, An embodiment in which display periods of image frames in image display apparatus are taken into consideration (third embodiment)
5. Regarding an example of the configuration of an image display apparatus and glasses for 3D image observation of the present invention
6. An example of processing corresponding to two-dimensional image information (fourth embodiment)

1. Description of the Overview of Processing Executed by an Image Display Apparatus of the Present Invention First, the overview of a process executed by an image display apparatus of the present invention will be described.

The present invention enables, in a 3D image display system using, for example, a time-division method (active stereo method), a 3D image to be displayed on the display apparatus and additional information such as a message to be presented to a person who is not wearing shutter-type glasses for 3D image observation.

That is, presentation of additional information as follows is realized:

an observer who is wearing shutter-type glasses for 3D image observation is "not required to see" the additional information; and an observer who is not wearing shutter-type glasses "sees" the additional information.

Specific examples of use will be briefly described.

(First Example of Use)

A first example of use (first use case) is an example of use in which the above-described additional information is a message prompting a person to wear shutter-type glasses for 3D image observation.

That is, a viewer who is wearing shutter-type glasses for 3D image observation can observe only a 3D video image without observing a message prompting the viewer to wear the glasses. In contrast, an observer who is not wearing shutter-type glasses for 3D image observation can check a message prompting the observer to wear the shutter-type glasses for 3D image observation.

(Second Example of Use)

A second example of use (second use case) is an example of use in which the above-described additional information is information that is unpleasant when seen or information that enables a main content video image to be comfortably appreciated when unseen.

An observer who is wearing shutter-type glasses for 3D image observation can observe a 3D image without observing unpleasant information or information that enables comfortable appreciation when unseen.

In contrast, an observer who is not wearing shutter-type glasses for 3D image observation observes unpleasant information or the like different from information constituting a normal 3D image, such as a gray image in which the entire screen is all gray, a distorted image, or a mosaic image.

For example, heretofore, pay broadcasting businesses and the like have been performing processes to differentiate services between legitimate viewers who have purchased content and non-legitimate viewers by presenting, to viewers who have not purchased content, a screen in which an image is excessively distorted or an image is mosaiced or by forcedly inserting advertisements in the screen.

As described above, by setting additional information as a distorted image, a mosaic image, or an advertisement image, the configuration is realized in which an observer who is not wearing shutter-type glasses (non-legitimate viewer who has not purchased content) perceives this, and an observer who is wearing shutter-type glasses (legitimate viewer who has purchased content) can observe a 3D image without perceiving this.

Hereinafter, the above-described two examples of use will be sequentially described. Note that, firstly in the following, examples of images presented to observers and a control sequence in the above-described two examples of use will be described. The configuration of an image display apparatus and glasses for 3D image observation will be described in a later section.

2. An Embodiment in which Additional Information Such as a Message for Wearing Glasses for 3D Image Observation is Presented to a Person Who is not Wearing the Glasses

First Embodiment

Firstly, the above-described first example of use (first use case) will be described as a first embodiment of the present invention. The first embodiment is an embodiment in which the additional information is a message prompting a person to wear glasses for 3D image observation.

Note that the present invention uses the 3D image display system using the time-division method (active stereo method), and the glasses for 3D image observation are glasses for performing an operation of alternately opening/closing glass portions corresponding to the left and right eyes. Specifically, for example, liquid-crystal shutter-type glasses are used.

In the present embodiment, a viewer who is wearing liquid-crystal shutter-type glasses for 3D image observation can observe only a 3D video image without observing a message prompting the viewer to wear the glasses. In contrast, an observer who is not wearing liquid-crystal shutter-type glasses for 3D image observation can check a message prompting the observer to wear the glasses.

Referring to FIG. 1, examples of two different perception images realized by the present embodiment will be described. In FIG. 1, the following two perception images are illustrated:

(a) a perception image of an observer who is not wearing glasses for 3D image observation (b) a perception image of an observer who is wearing glasses for 3D image observation These perception images are images perceived by individual observers who are observing the same video image displayed on the same image display apparatus.

FIG. 1(a) is a perception image perceived by an observer 11 who observes a display surface of an image display apparatus 30 without wearing liquid-crystal shutter glasses that are glasses for 3D image observation. (b) is a perception image of an observer 21 who wears liquid-crystal shutter glasses 23 and observes the display surface of the image display apparatus 30.

The observer 11 illustrated in FIG. 1(a) perceives each object displayed on the display surface of the image display apparatus 30 as a two-dimensional multi-image. In contrast, the observer 21 illustrated in FIG. 1(b) perceives each object displayed on the display surface of the image display apparatus 30 as a stereoscopic image with a depth. That is, the observer 21 can perceive a normal 3D image.

Display images of the image display apparatus 30 correspond to 3D image display using the time-division method (active stereo method). The observer 21 who is wearing the liquid-crystal shutter glasses 23 which are glasses for 3D image observation illustrated in FIG. 1(b) observes, using the individual eyes, an image for the left eye and an image for the right eye that are time-division display frames via the liquid-crystal shutter glasses 23, thereby perceiving an image with a stereoscopic effect.

In contrast, the observer 11 who is not wearing glasses for 3D image observation illustrated in FIG. 1(a) observes, using both eyes, all of the image for the left eye and the image for the right eye that are time-division display frames, and perceives displayed objects as two-dimensional multi-images.

Further, additional information 31 that is the subtitle "please see the screen with the glasses on" is perceived in a lower region of the perception image of the observer 11. The observer 21 does not perceive this subtitle, which is the additional information 31.

The image display apparatus 30 and display content used for both the observers 11 and 21 are the same, and the difference between the image perceived by the observer 11 and the image perceived by the observer 21 results only from the fact that the observer 21 is wearing the liquid-crystal shutter glasses. The frame configuration of content displayed on the image display apparatus 30 will be described with reference to FIG. 2.

Figure 2:
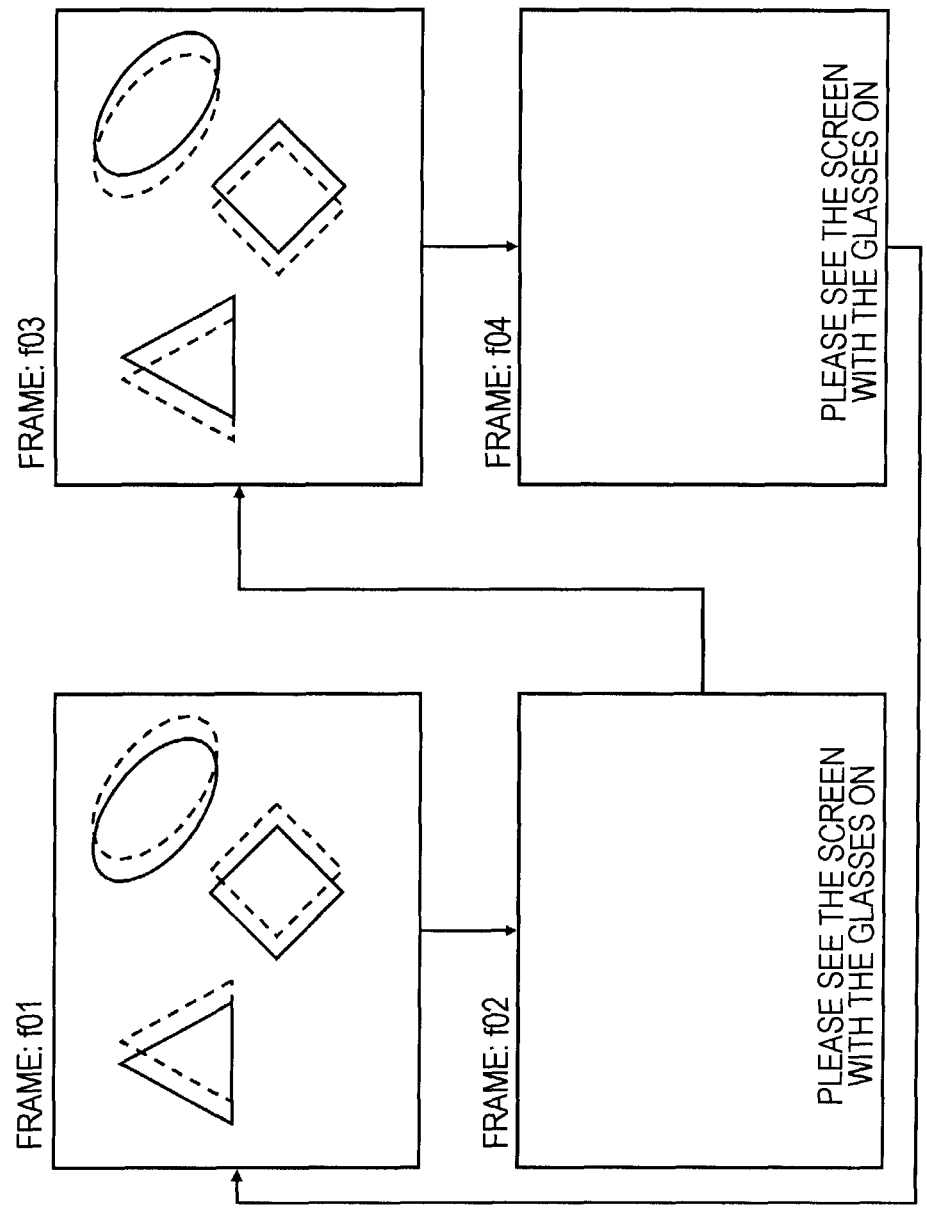
FIG. 2 is a diagram describing an image display sequence in the embodiment of the present invention.

FIG. 2 illustrates an example of the sequence of individual frame images displayed on the image display apparatus 30 in order to enable an observer who is wearing glasses for 3D image observation and an observer who is not wearing the glasses to perceive different images, as illustrated in FIG. 1.

FIG. 2 illustrates the fact that frames f01 to f04 are sequentially displayed, and the sequence returns to the frame f01 again after the frame f04 is displayed, and the frames f01 to f04 are repeatedly displayed.

Note that each of the frames f01 to f04 may be set to correspond to one frame displayed on the image display apparatus, or each of the frames f01 to f04 may be set to correspond to a plurality of (n) frames displayed on the image display apparatus. It means that images in the frames f01 to f04 illustrated in FIG. 2 are displayed at a certain time interval. The same applies to frames in the following description.

Note that, in FIG. 2, display objects illustrated in the display frames f01 and f03 are indicated using combinations of a solid line and a dotted line. The solid line corresponds to display data, and the dotted line corresponds to non-display data. The display frames f01 and f03 are an image for the left eye and an image for the right eye, respectively. It is indicated that, for the same object, images from the respective viewpoints are displayed.

The frames f01 to f04 as illustrated in FIG. 2 are switched at a fast rate and displayed on the image display apparatus 30. When this is observed without using liquid-crystal shutter glasses, as in the observer 11 illustrated in FIG. 1(a), a video image in which images corresponding to a few frames are added is perceived because of the visual integral effect in the time domain. As a result, the perception image illustrated in FIG. 1(a) is perceived by the observer 11. Note that the principle of vision regarding the light integral effect in the time domain is a phenomenon known as Bloch's law. Bloch's law is described in, for example, Japanese Unexamined Patent Application Publication No. 2005-175841 or the like.

In contrast, when the frames f01 to f04 illustrated in FIG. 2 are observed with liquid-crystal shutter glasses on, as in the observer 21 illustrated in FIG. 1(b), an image perceived by the observer 21 in FIG. 1 is an image of stereoscopic objects, as illustrated in FIG. 1(b). However, it is necessary to synchronize the timing of display images and liquid-crystal shutters in order to obtain such a perception image.

Figure 3:
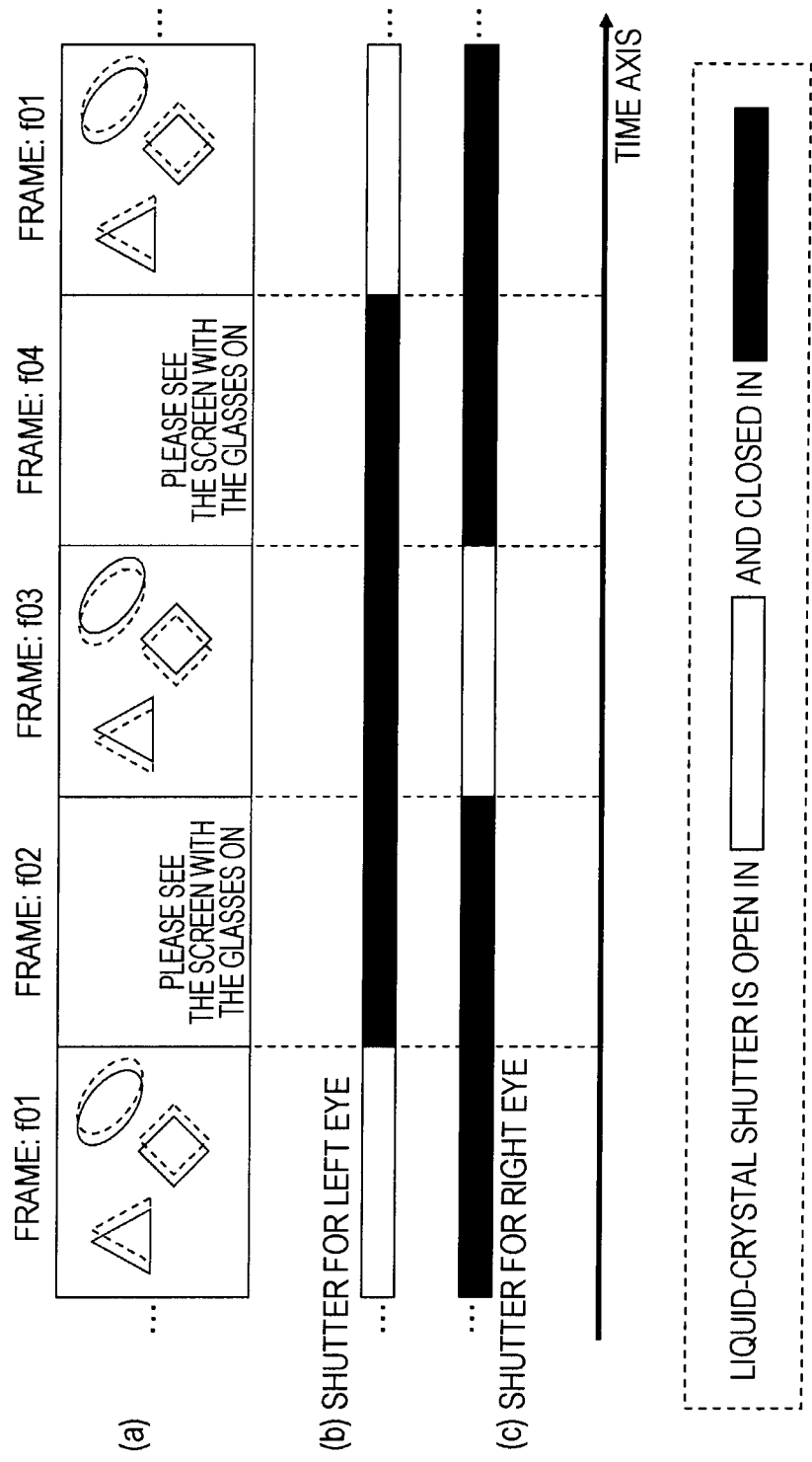
FIG. 3 is a diagram describing an image display sequence and a shutter-of-glasses control sequence in the embodiment of the present invention.

Referring to FIG. 3, an example of a process of synchronizing switching of display images and the open/close timing of liquid-crystal shutters will be described. In FIG. 3, the horizontal direction corresponds to the time axis, and it is represented that time progresses from left to right.

FIG. 3(a) illustrates the sequence of switching the display image frames (f01 to f04) displayed on the image display apparatus.

(b) illustrates a timing of opening/closing a liquid-crystal shutter for the left eye of the liquid-crystal shutter glasses.

(c) illustrates a timing of opening/closing a liquid-crystal shutter for the right eye of the liquid-crystal shutter glasses.

Note that the liquid-crystal shutters for both the left and right eyes assume ideal opening/closing, and it is illustrated that an open/closed state transition period at the time of switching from an "open" state to a "closed" state is 0.

When the timing control of opening/closing the liquid-crystal shutters as illustrated in FIG. 3 can be performed, only the image in the frame f01 is input to the left eye of the observer 21 who is wearing the liquid-crystal shutter glasses 23 illustrated in FIG. 1(b), and only the image in the frame f03 is constantly input to the right eye. As a result, based on the principle of stereovision, an image perceived by the observer 21 in FIG. 1 is a perception image in which the objects illustrated in FIG. 1(b) can be observed as stereoscopic images.

The frame f02 and the frame f04 illustrated in FIG. 3 are not input to both eyes at any timing. Thus, the subtitle "please see the screen with the glasses on" is not perceived by the observer 21.

However, there are two problems that must be taken into consideration in order to generate the perception result described so far.

The first one is the problem that a person perceives the so-called flicker phenomenon in which flicker of an image is felt. When the maintaining period of each display image and the open state and the closed state of a liquid-crystal shutter is longer than a certain period, that is, when frame switching is at a lower rate than a normal rate, particularly the observer 11 who is not wearing the glasses feels flicker of an image. This is the flicker phenomenon. In order to reduce the flicker phenomenon, switching of display frames and switching of opening/closing liquid-crystal shutters must be at a faster rate than a certain value.

The second one is the problem that, because a certain time is required to switch between the open/closed states of the liquid-crystal shutter glasses, a screen that is desired to be shut out is seen. In FIG. 3, the ideal that the open/closed state transition period of the liquid-crystal shutter glasses is 0 is assumed. However, the actual open/closed state transition period is not 0, and the transition reaches an open state or a closed state through a state in which the amount of light transmission is intermediate.

Figure 4:
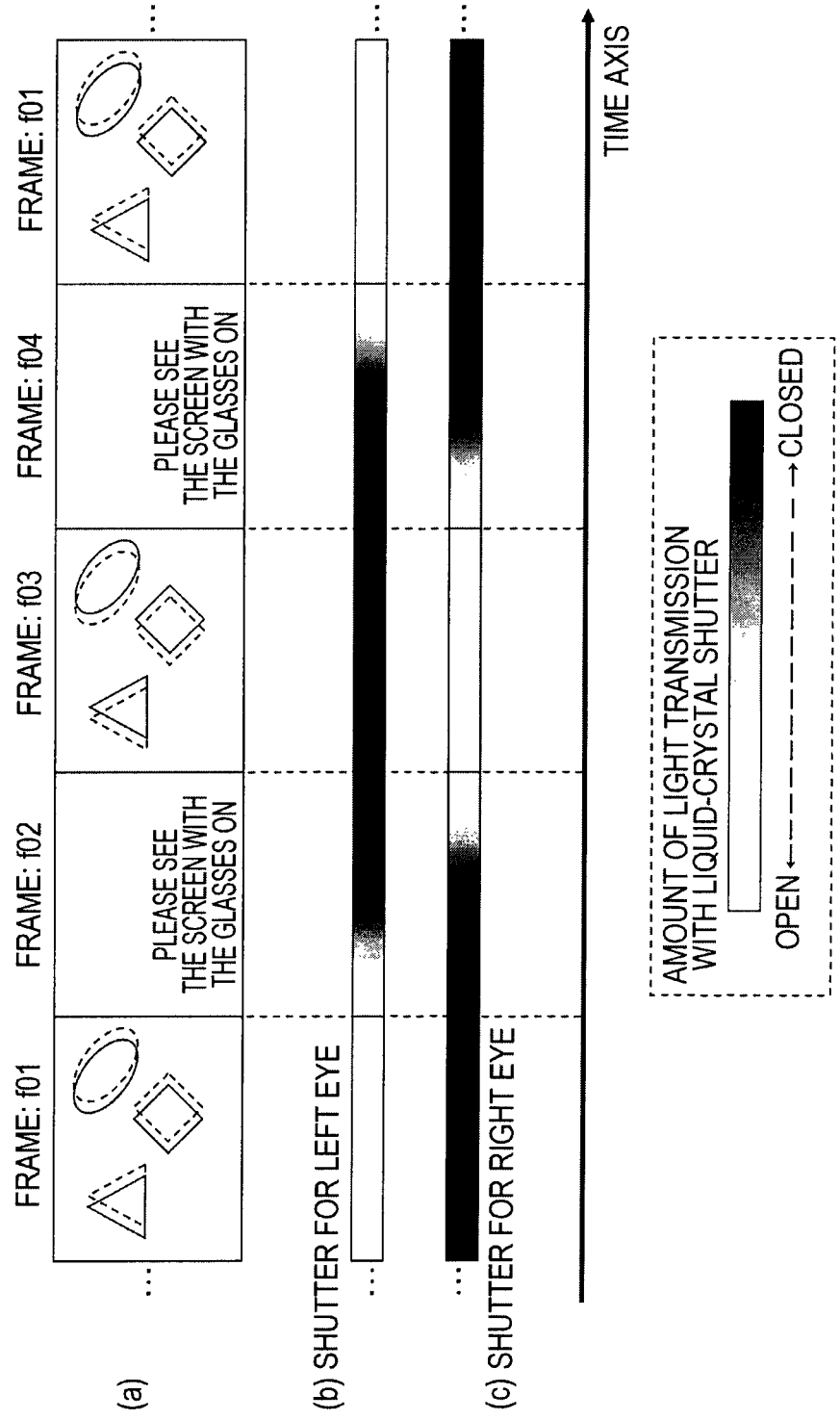
FIG. 4 is a diagram describing an image display sequence and a shutter-of-glasses control sequence in the embodiment of the present invention.

Referring to FIG. 4, this problem will be described. FIG. 4 is a diagram describing synchronization of switching of display images and the open/close timing of liquid-crystal shutters when realistic liquid-crystal shutter glasses are used. FIG. 4 illustrates an example of a problem that occurs due to the existence of an open/closed state transition period of the liquid-crystal shutters.

As in FIG. 3, FIG. 4 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

Gradation in the drawings of the open/close timing of the liquid-crystal shutters in (b) and (c) represents the amount of light transmission through the liquid-crystal shutters in terms of luminance, as indicated at the bottom of FIG. 4, and a state in which the amount of transmission is intermediate occurs at the time of switching from open to closed or from closed to open.

The problem that occurs in the example illustrated in FIG. 4 occurs because light is not completely blocked by the liquid-crystal shutters in periods during which the frame f02 and the frame f04 are displayed. It takes time to switch between the liquid-crystal shutters. As a result, the problem occurs that even the observer 21 who is wearing the liquid-crystal shutter glasses perceives display of the subtitle "please see the screen with the glasses on" which is the additional information.

Further, depending on the length of the transition period that occurs at the time of switching between the liquid-crystal shutters or the order of switching the display images, the so-called crosstalk phenomenon may occur in which an image for the left eye (frame f01) for stereoscopic visibility is input to the right eye and, conversely, an image for the right eye (frame f03) is input to the left eye. This may reduce a reduction of the stereoscopic effect.

An example of a solution to the problem that occurs due to the existence of an open/closed state transition period at the time of switching between an open state and a closed state of the liquid-crystal shutter glasses will be described with reference to FIG. 5.

Figure 5:
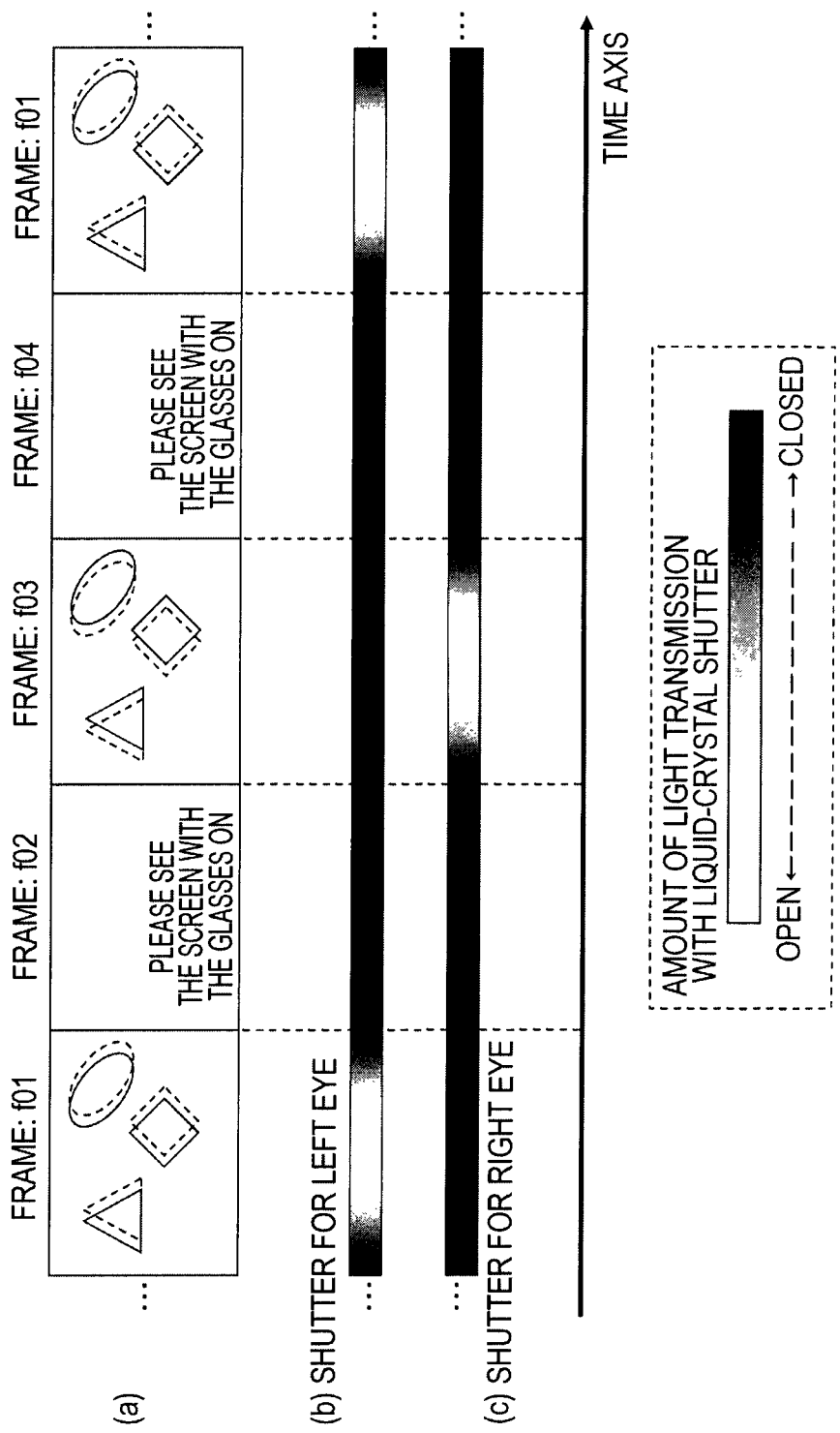
FIG. 5 is a diagram describing an image display sequence and a shutter-of-glasses control sequence in the embodiment of the present invention.

FIG. 5 is an example where a transition period in which a liquid crystal shutter is switched between an open state and a closed state is certainly completed while an image input to one of both the left and right eyes is being displayed.

As in FIG. 3 and FIG. 4, FIG. 5 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

FIG. 5 is a diagram describing synchronization of switching of display images and the timing of opening/closing liquid-crystal shutters in order to enable observation of a good 3D image when realistic liquid-crystal shutter glasses in which a certain transition period exists in opening/closing of the shutters is used. This takes into consideration the problem caused by the existence of the above-described liquid-crystal shutter open/closed state transition period.

In FIG. 5, the start timing of closing a shutter of the liquid-crystal shutter glasses is set to be earlier than the screen switching timing, and transition from closed to open is set to be later than the screen switching timing.

When such control is performed, as illustrated in FIG. 5, the shutters for both the left and right eyes of the shutter glasses are completely in a closed state in periods in which the frame f02 and the frame f04 including additional information are displayed. Also, processing is realized in which only the shutter for the left eye is open in a period in which the frame f01 intended to be input to the left eye is displayed, and only the shutter for the right eye is open in a period in which the frame f03 intended to be input to the right eye is displayed.

By adopting the shutter opening/closing control illustrated in FIG. 5, the phenomenon in which display of the subtitle "please see the screen with the glasses on" which is the additional information is perceived by an observer who is wearing glasses for 3D image observation, and the crosstalk phenomenon in which images for the left and right are perceived in a mixed manner can be avoided.

Note that, in the configuration illustrated in FIG. 5, because a period in which one of the shutters for both the left and right eyes is completely open is too short, an observer who is wearing the glasses feels darkness unless the display luminance of the display is considerably increased. Also, when a moving image is displayed, unnaturalness called the jerkiness phenomenon may be perceived in a moving region because of the similar reason.

An example of a process for solving this problem will be described with reference to FIG. 6.

Figure 6:
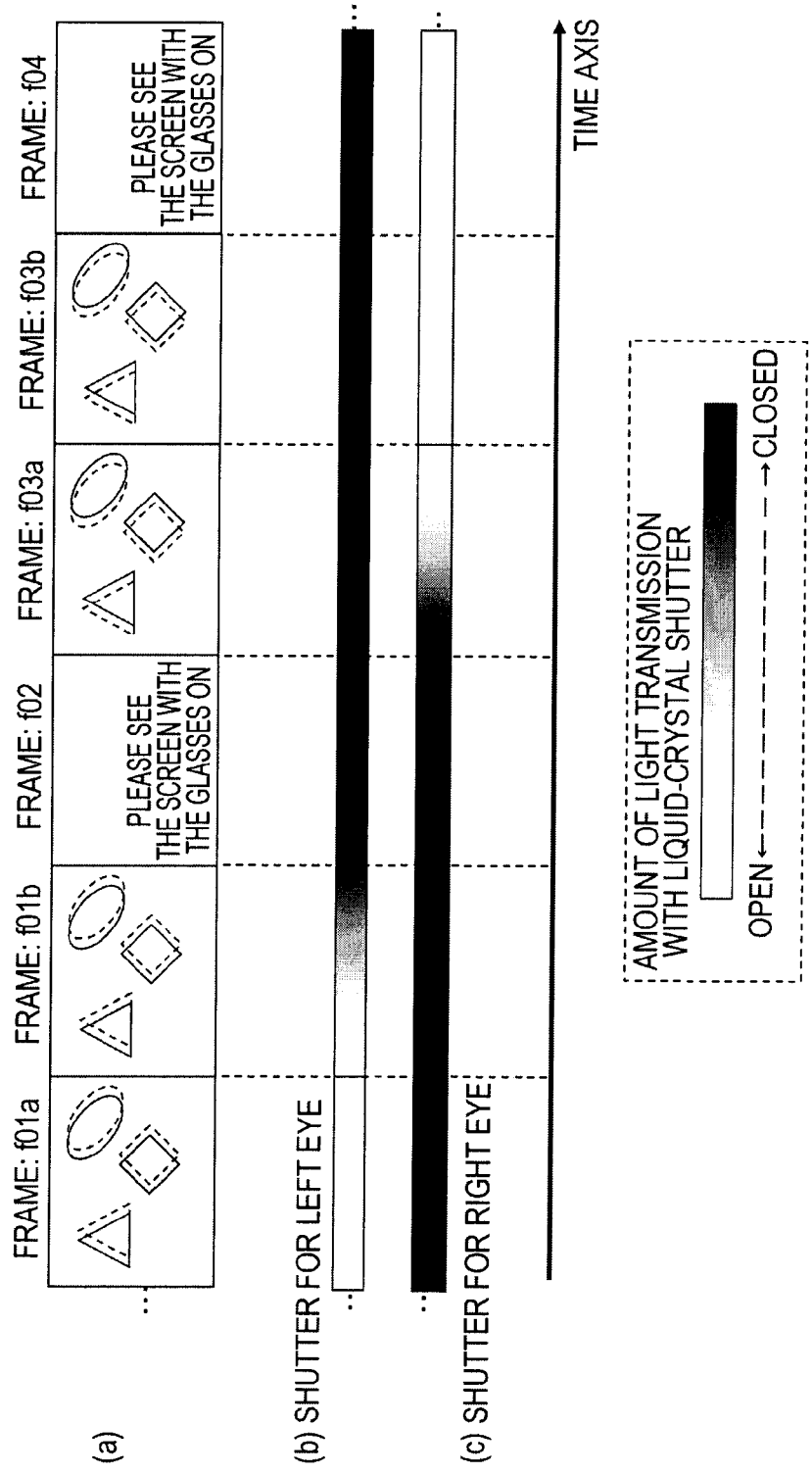
FIG. 6 is a diagram describing an image display sequence and a shutter-of-glasses control sequence in the embodiment of the present invention.

FIG. 6 is an example where a solution to the above-described problem is sought by devising display images.

As in FIG. 3 to FIG. 5, FIG. 6 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

As in FIG. 5, FIG. 6 illustrates a technique for solving the problem caused by the existence of the liquid-crystal shutter open/closed state transition period.

Specifically, as illustrated in FIG. 6, a frame f01a and a frame f01b that have the same image for the left eye are consecutively displayed in a display period of two frames, and thereafter the frame f02 including the additional information "please see the screen with the glasses on" is displayed only in a display period of one frame. Further, thereafter, a frame f03a and a frame f03b that have the same image for the right eye are consecutively displayed in a display period of two frames, and thereafter the frame f04 including the additional information is displayed only in a display period of one frame. This processing is repeated.

As in the control illustrated in FIG. 5, also in the configuration illustrated in FIG. 6, the start timing of closing a shutter of the liquid-crystal shutter glasses is set to be earlier than the screen switching timing, and transition from closed to open is set to be later than the screen switching timing. Therefore, an observer who is wearing liquid-crystal shutter glasses can observe only an image for the right eye with the right eye and an image for the left eye with the left eye.

Further, in the processing illustrated in FIG. 6, the configuration is such that an image for the right eye and an image for the left eye, which are images for 3D image observation, are consecutively displayed for a plurality of (2 frames in this example) frames, which means that the frame allocation is set to be greater than a frame including the additional information.

In the previously-described configuration illustrated in FIG. 5, there is a disadvantage that an observer who is wearing the glasses feels darkness since a period in which one of the shutters for both the left and right eyes is completely open is too short. However, in the processing sequence illustrated in FIG. 6, a display period of an image for the right eye and an image for the left eye for presenting a 3D image is made longer than a display period of additional information including a subtitle, and the level at which the observer of the 3D image feels darkness can be reduced. Also, when a moving image is displayed, perception of jerkiness can be reduced.

Note that, even when the sequence illustrated in FIG. 6 is performed, as described above, the image display apparatus is required to perform frame switching at a faster rate in order to prevent the observer 11 who is not wearing the glasses from perceiving the flicker phenomenon.

3. An Embodiment in which a Comfortable 3D Image can be Presented Only to a Person Who is Wearing Shutter-Type Glasses for 3D Image Observation

Second Embodiment

Next, the above-described second example of use (second use case) will be described as a second embodiment of the present invention. The second embodiment is an example in which the additional information is information that obstructs normal observation of a 3D image.

In the present embodiment, an observer who is wearing glasses for 3D image observation perceives a 3D (stereoscopic) video image, and a person who is not wearing glasses for 3D image observation observes information (additional information) that obstructs normal observation of a 3D image. Hereinafter, as a specific example, an example in which a person who is not wearing glasses for 3D image observation observes an image where the entire screen is gray will be described.

Figure 7:
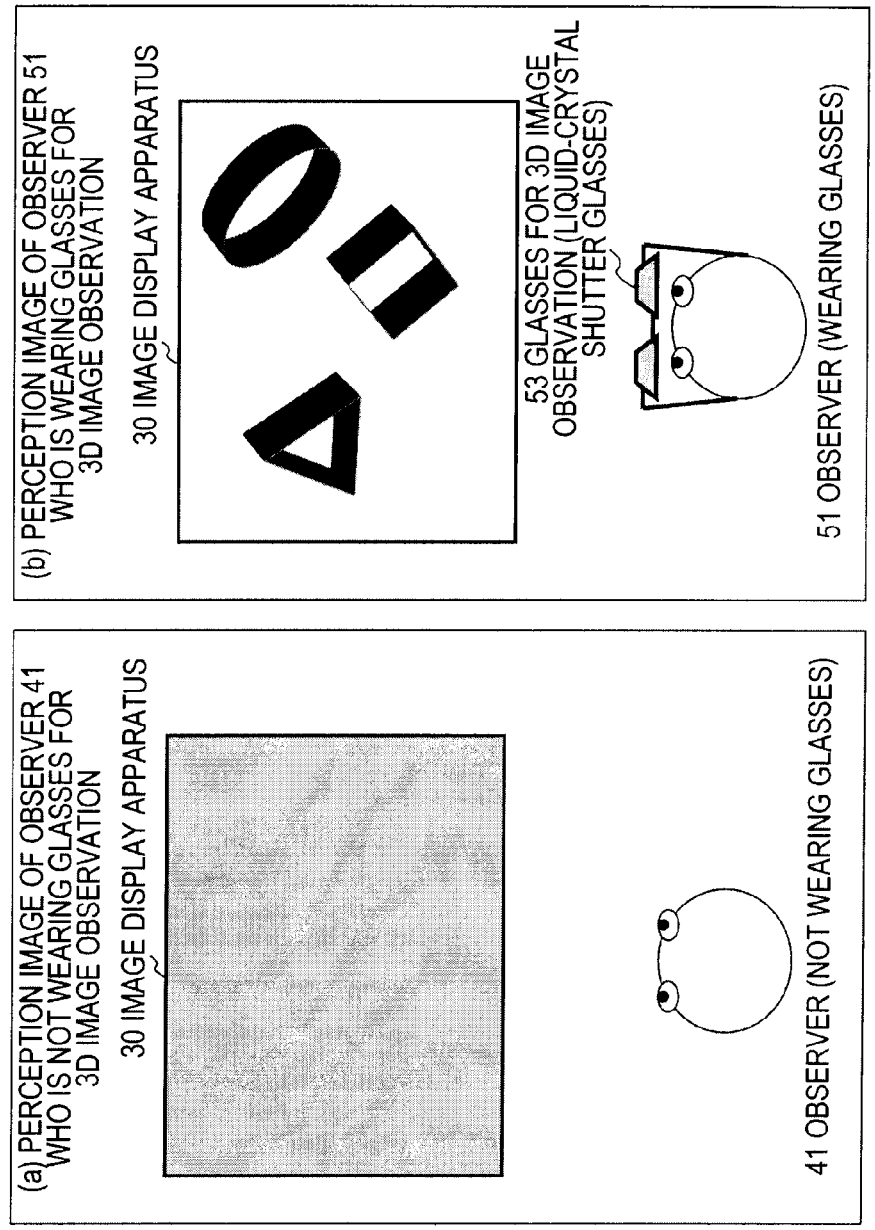
FIG. 7 includes diagrams describing examples of images perceived by an observer who is wearing glasses for 3D image observation and an observer who is not wearing the glasses in an embodiment of the present invention.

Referring to FIG. 7, examples of two different perception images realized by the present embodiment will be described. In FIG. 7, the following two perception images are illustrated:

(a) a perception image of an observer who is not wearing glasses for 3D image observation (b) a perception image of an observer who is wearing glasses for 3D image observation These perception images are images perceived by the individual observers who are observing the same video image displayed on a display of the same image display apparatus 30.

FIG. 7(a) is a perception image perceived by an observer 41 who observes a display surface of the image display apparatus 30 without wearing liquid-crystal shutter glasses that are glasses for 3D image observation. FIG. 7(b) is a perception image of an observer 51 who wears liquid-crystal shutter glasses 53 and observes the display surface of the image display apparatus 30.

The observer 41 illustrated in FIG. 7(a) perceives an image where the entire screen displayed on the display surface of the image display apparatus 30 is gray. The observer 51 illustrated in FIG. 7(b) perceives each object displayed on the display surface of the image display apparatus 30 as a stereoscopic image with a depth. That is, the observer 51 can perceive a normal 3D image.

Display images of the image display apparatus 30 correspond to 3D image display using the time-division method (active stereo method). The observer 51 who is wearing the liquid-crystal shutter glasses 53 which are glasses for 3D image observation illustrated in FIG. 7(b) observes, using the individual eyes, an image for the left eye and an image for the right eye that are time-division display frames via the liquid-crystal shutter glasses 53, thereby perceiving an image with a stereoscopic effect.

In contrast, the observer 41 who is not wearing glasses for 3D image observation illustrated in FIG. 7(a) observes, using both eyes, all of the image for the left eye and the image for the right eye that are time-division display frames. Further, the observer 41 observes a frame image including additional information different from the image for the left eye and the image for the right eye. As a result, the observer 41 observes all these presented images using both eyes, and perceives an image in which the entire screen is gray illustrated in FIG. 7(a).

The image display apparatus 30 and display content used for both the observers 41 and 51 are the same, and the difference between the image perceived by the observer 41 and the image perceived by the observer 51 results only from the fact that the observer 51 is wearing the liquid-crystal shutter glasses. The frame configuration of content displayed on the image display apparatus 30 will be described with reference to FIG. 8.

Figure 8:
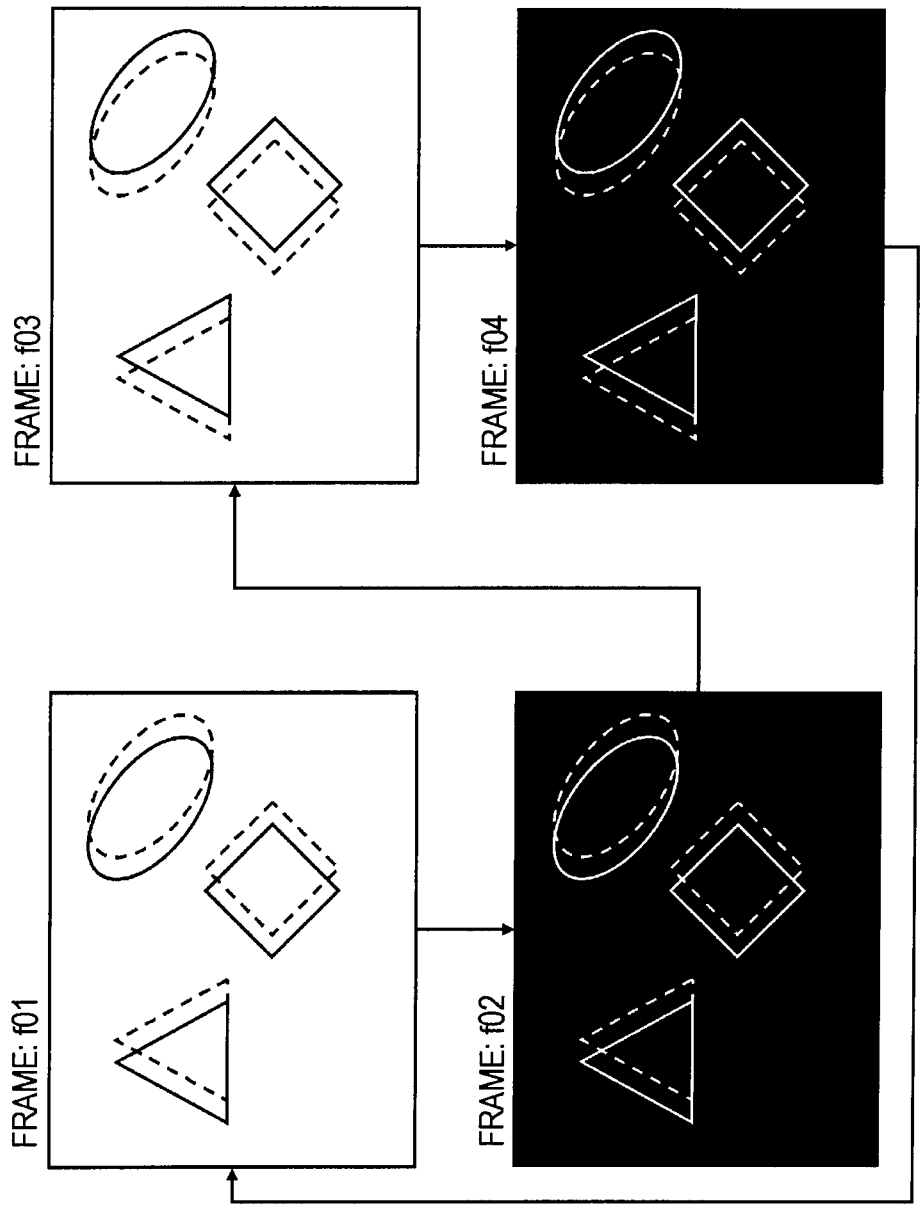
FIG. 8 is a diagram describing an image display sequence in the embodiment of the present invention.

FIG. 8 illustrates an example of the sequence of individual frame images displayed on the image display apparatus 30 in order to enable an observer who is wearing glasses for 3D image observation and an observer who is not wearing the glasses to perceive different images, as illustrated in FIG. 7.

FIG. 8 illustrates the fact that frames f01 to f04 are sequentially displayed, and the sequence returns to the frame f01 again after the frame f04 is displayed, and the frames f01 to f04 are repeatedly displayed.

Note that, in FIG. 8, display objects illustrated in the display frames f01 and f03 are indicated using combinations of a solid line and a dotted line. The solid line corresponds to display data, and the dotted line corresponds to non-display data. The display frames f01 and f03 are an image for the left eye and an image for the right eye, respectively. It is indicated that, for the same object, images from the respective viewpoints are displayed.

Also, in FIG. 8, the display frame f02 is a frame including an inverted image of the frame f01. Also, the display frame f04 is a frame including an inverted image of the frame f03.

An inverted image is an image including each pixel value obtained by subtracting each pixel value of the original image from the maximum pixel value. For example, when the original image is a monochrome 8-bit image, and when the pixel value of a pixel at the coordinates x, y of the original image is p(x, y), the pixel value p'(x, y) at the coordinates x, y of the inverted image is p'(x, y)=255-p(x, y). 255 is the maximum pixel value in the case where a pixel value is based on 8-bit representation. This definition of an inverted image is applicable without being restricted to the signal format of an image or the like.

The display images (frames f01 to f04) as illustrated in FIG. 8 are switched at a fast rate and are repeatedly displayed on the image display apparatus. When this is observed without using the liquid-crystal shutter glasses, as in the observer 41 illustrated in FIG. 7, a video image in which images corresponding to a few frames are added is perceived because of the visual integral effect in the time domain. As a result, an image in which the entire screen is gray is perceived, as illustrated in FIG. 7(a).

Note that, strictly speaking, when the observer 41 who is not wearing liquid-crystal shutter glasses is performing fixed vision of the display images, an image in which the entire screen is gray is perceived, as illustrated in FIG. 7(a). When the observer 41 is observing while moving the eyeballs, at least an image in which the entire screen is all gray is not perceived. However, the level is not sufficiently high enough to recognize the objects indicated in the frames f01 and f03, which is sufficient for achieving the effect "not showing display content", which is an object of the present embodiment.

Note that, when the original images for presenting a 3D image are monochrome images, an image in which the entire screen is gray is perceived, as illustrated in FIG. 7(a), by using the above-described inverted images. When the original images for presenting a 3D image are color images, it is possible to disable an observer who is not wearing glasses for 3D image observation from seeing clear 3D content by performing processing or the like using, instead of the inverted images, an image frame including disturbance information for an image frame for the left eye or an image frame for the right eye, such as an image in which a random color pattern is set. That is, as frames including a specific image to be inserted, various images can be used as long as they are images different from images including 3D content.

In contrast, the observer 51 who is wearing the glasses for 3D image observation illustrated in FIG. 7 perceives an image of stereoscopic objects as illustrated in FIG. 7(b). However, it is necessary to synchronize the timing of display images and liquid-crystal shutters in order to obtain such a perception image.

Figure 9:
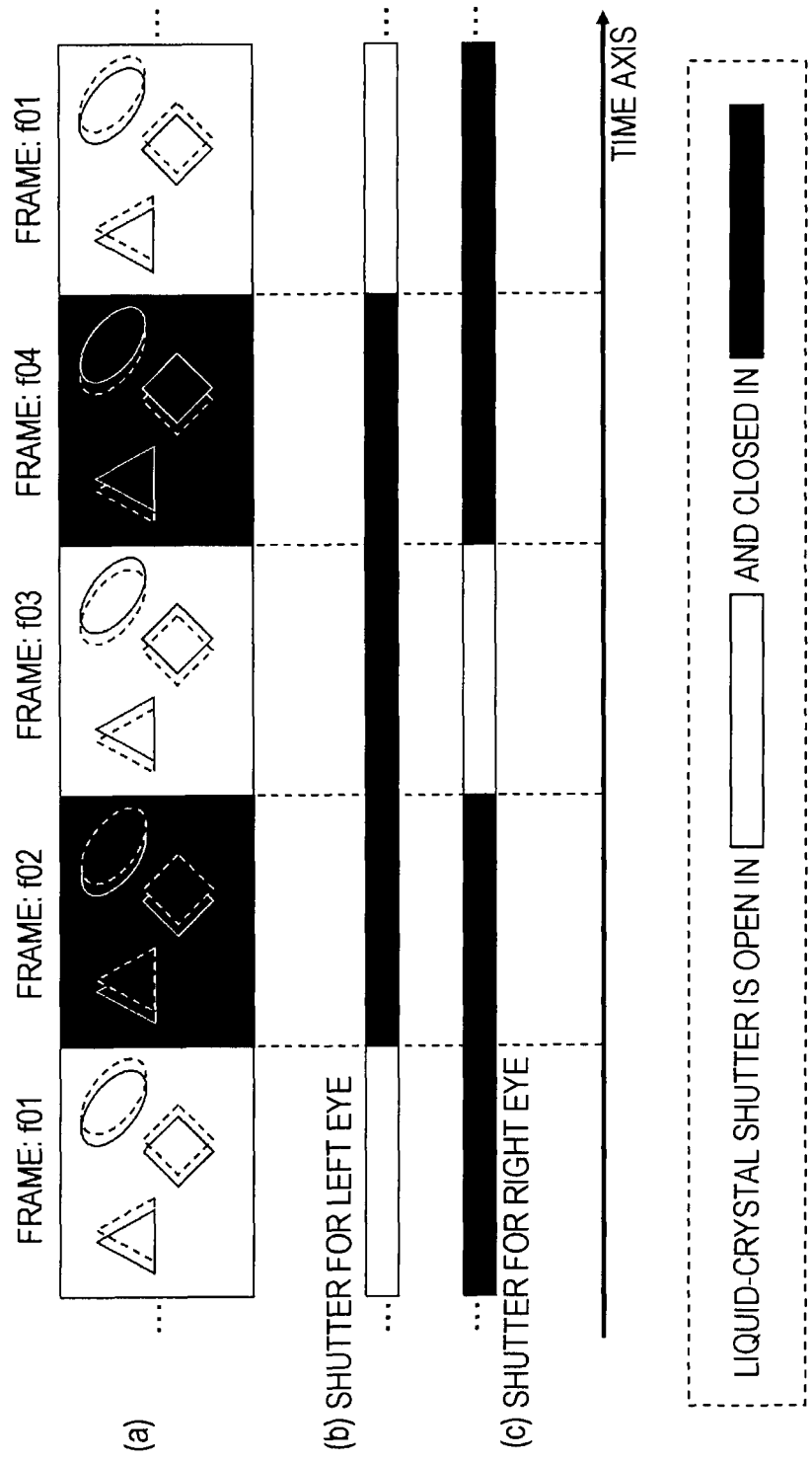
FIG. 9 is a diagram describing an image display sequence and a shutter-of-glasses control sequence in the embodiment of the present invention.

Referring to FIG. 9, an example of a process of synchronizing switching of display images and the open/close timing of liquid-crystal shutters will be described. In FIG. 9, the horizontal direction corresponds to the time axis, and it is represented that time progresses from left to right.

FIG. 9 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

Note that the liquid-crystal shutters for both the left and right eyes assume ideal opening/closing, and it is illustrated that an open/closed state transition period at the time of switching from an "open" state to a "closed" state is 0.

When the timing control of opening/closing the liquid-crystal shutters as illustrated in FIG. 9 can be performed, only the image in the frame f01 is input to the left eye of the observer 51 who is wearing the liquid-crystal shutter glasses 53 illustrated in FIG. 7(b), and only the image in the frame f03 is constantly input to the right eye. As a result, based on the principle of stereovision, an image perceived by the observer 51 in FIG. 7 is a perception image in which the objects illustrated in FIG. 7(b) can be observed as stereoscopic images.

The frame f02 and the frame f04 which have the additional information illustrated in FIG. 9 are not input to both eyes at any timing. Thus, the subtitle "please see the screen with the glasses on" is not perceived by the observer 21. Accordingly, the observer 51 who is wearing the liquid-crystal shutter glasses 53 illustrated in FIG. 7(b) observes a normal 3D image.

Note that, also in the second embodiment, as in the first embodiment described previously, there are problems that must be taken into consideration. That is, these problems are:

the occurrence of flicker; and a transition period in switching of shutters between an open state and a closed state.

As described above, flicker is caused by the fact that frame switching is at a lower rate than a certain rate. In order not to give rise to a problem that the flicker phenomenon is perceived, switching of display frames and switching of opening/closing liquid-crystal shutters must be at a faster rate than a certain value. Note that, in the case of the second embodiment, the integral effect in the time domain is not caused when the frame rate is lower than a certain rate, and an image in which the entire screen is gray is not perceived while only images in which the frames f01 to f04 are simply switched are perceived. To achieve this, the display refresh rate is required to be a high rate.

Further, as in the first embodiment described above, it is necessary to take into consideration the problem caused by the fact that, in a transition period in which the liquid-crystal shutter glasses are switched between an open state and a closed state, the transition reaches an open state or a closed state through a state in which the amount of light transmission is intermediate.

It is necessary to avoid the phenomenon in which an observer who is wearing shutter glasses perceives images not intended to be input to both eyes, that is, the frames f02 and f04 illustrated in FIG. 9, or an image intended to be input to the left eye is input to the right eye, and conversely an image intended to be input to the right eye is input to the left eye.

An example of a solution to the problem that occurs due to the existence of an open/closed state transition period at the time of switching between an open state and a closed state of the liquid-crystal shutter glasses will be described with reference to FIG. 10.

Figure 10:
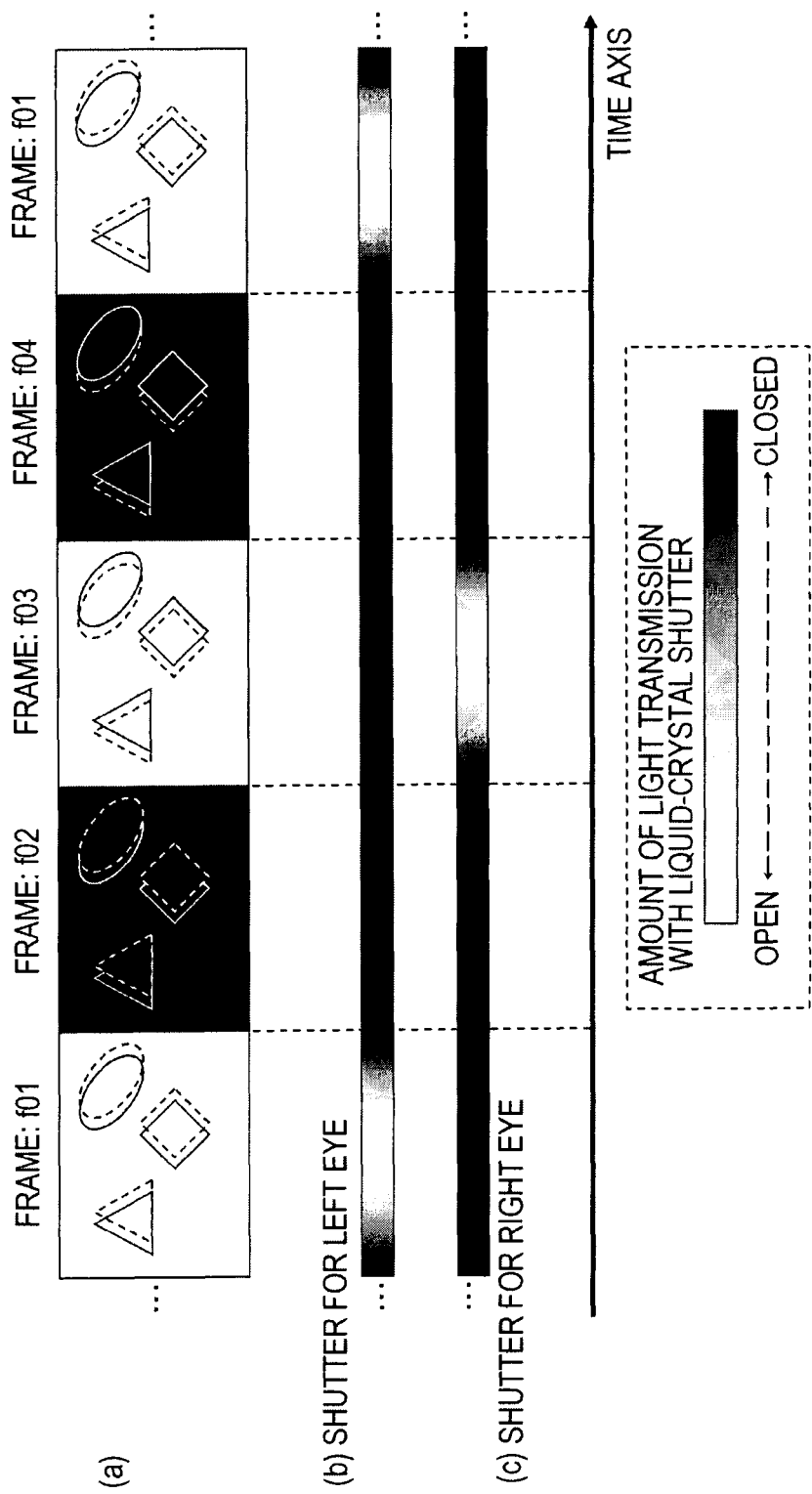
FIG. 10 is a diagram describing an image display sequence and a shutter-of-glasses control sequence in the embodiment of the present invention.

FIG. 10 is an example where a transition period in which a liquid crystal shutter is switched between an open state and a closed state is certainly completed while an image input to one of both the left and right eyes is being displayed.

As in FIG. 9, FIG. 10 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

FIG. 10 is a diagram describing synchronization of switching of display images and the timing of opening/closing liquid-crystal shutters when realistic liquid-crystal shutter glasses in which a certain transition period exists in opening/closing of the shutters is used. This takes into consideration the problem caused by the existence of the liquid-crystal shutter open/closed state transition period. The example illustrated in FIG. 10 is an example in which the start timing of closing a shutter of the liquid-crystal shutter glasses is set to be earlier than the screen switching timing, and transition from closed to open is set to be later than the screen switching timing.

When such control is performed, as illustrated in FIG. 10, the shutters for both the left and right eyes of the shutter glasses are completely in a closed state in periods in which the frame f02 and the frame f04 including additional information including the inverted images as illustrated in FIG. 10 are displayed. Also, processing is realized in which only the shutter for the left eye is open in a period in which the frame f01 intended to be input to the left eye is displayed, and only the shutter for the right eye is open in a period in which the frame f03 intended to be input to the right eye is displayed.

By adopting the shutter opening/closing control illustrated in FIG. 10, the phenomenon in which display of the inverted image frames f02 and f04 which are additional information frames is perceived by an observer who is wearing glasses for 3D image observation, and the crosstalk phenomenon in which images for the left and right are perceived in a mixed manner can be avoided.

4. An Embodiment in which Display Periods of Image Frames in Image Display Apparatus are Taken into Consideration Third Embodiment In the first embodiment and the second embodiment described above, it has been described that frame display in the image display apparatus is instantaneously switched. That is, a frame display switching period is not taken into consideration. Hereinafter, as a third embodiment, an embodiment in which one frame image of the image display apparatus is displayed while the display unit of the image display apparatus is sequentially scanned from the upper left end to the lower right end, and a certain frame display switching period (Tf) is taken into consideration.

Figure 11:
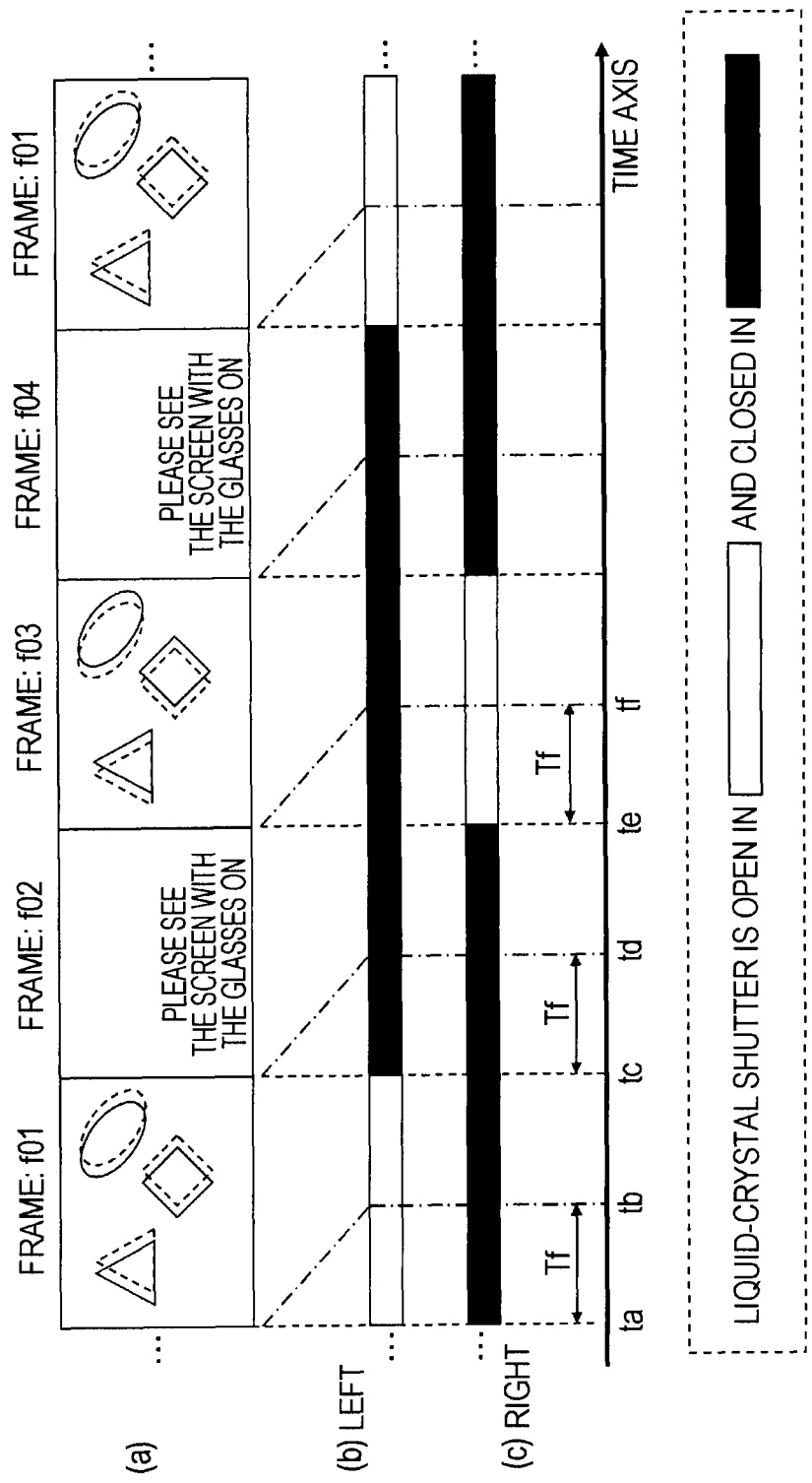
FIG. 11 is a diagram describing an image display sequence and a shutter-of-glasses control sequence in the embodiment of the present invention.

FIG. 11 is a diagram illustrating the sequence of switching of display images and switching of liquid-crystal shutters as in FIG. 3 described in the first embodiment above. FIG. 11 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

In FIG. 11, the frame display switching period (Tf) is illustrated. For example, regarding the frame f01, display starts at time to from the upper left end of the screen, and display of the entirety up to the lower right end of the screen ends at time tb. That is, it is indicated that a frame display transition period from the frame display start to the frame display completion of the frame f01 is Tf=ta~tb. A display transition period of the frame f02 which is the next frame is Tf=tc~td. A display transition period of the frame f03 is Tf=te~tf.

In FIGS. 11(b) and (c), a sequence which is the same as the shutter control sequence described with reference to FIG. 3 above is illustrated. When shutter control illustrated in FIGS. 11(b) and (c) is executed, for example, the right shutter of the glasses for 3D image observation is in an open state in Tf=te~tf which is a frame switching period from the frame f02 to the frame f03. In this period Tf=te~tf, display of f03 which is an image for the right eye is not completed, and the frame f02 including additional information including a message is partially displayed. That is, an observer who is wearing glasses for 3D image observation observes, with the right eye, the frame f02 including the message. A similar phenomenon consecutively occurs at a display switching timing of each frame.

Figure 12:
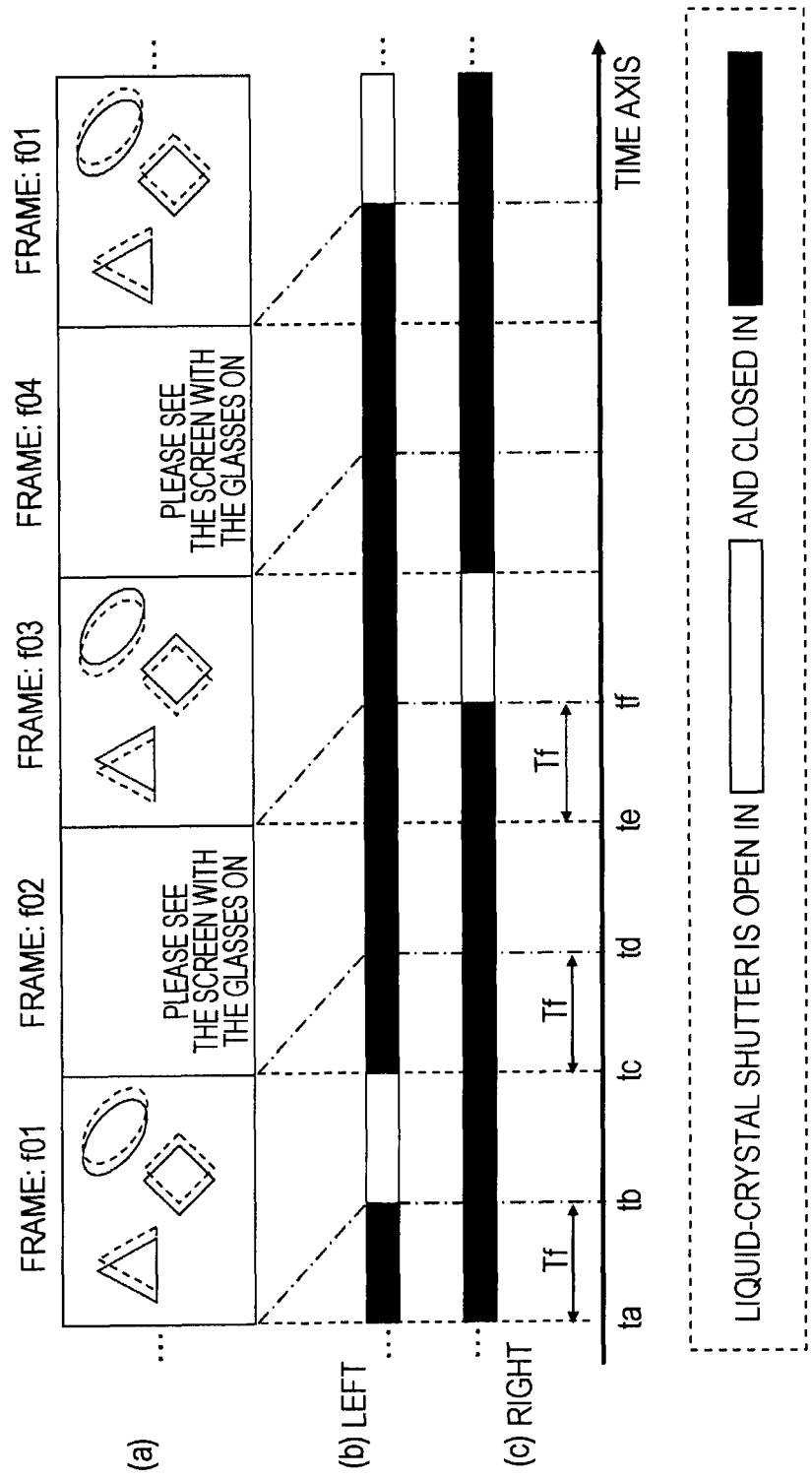
FIG. 12 is a diagram describing an image display sequence and a shutter-of-glasses control sequence in the embodiment of the present invention.

FIG. 12 is a diagram illustrating a shutter switching control sequence for avoiding such a failure. The example illustrated in FIG. 12 is an example in which all the shutters of the glasses for 3D image observation are set to be closed in the display transition period (Tf) of each frame. By executing such control, an observer who is wearing glasses for 3D image observation observes no image at all in the display transition period (Tf) of each frame. As a result, an observer who is wearing glasses for 3D image observation observes, with the respective eyes, only the frames f01 and f03 corresponding to a 3D image, without observing the frames f02 and f04 including additional information including a message, thereby perceiving only a 3D image.

Figure 13:
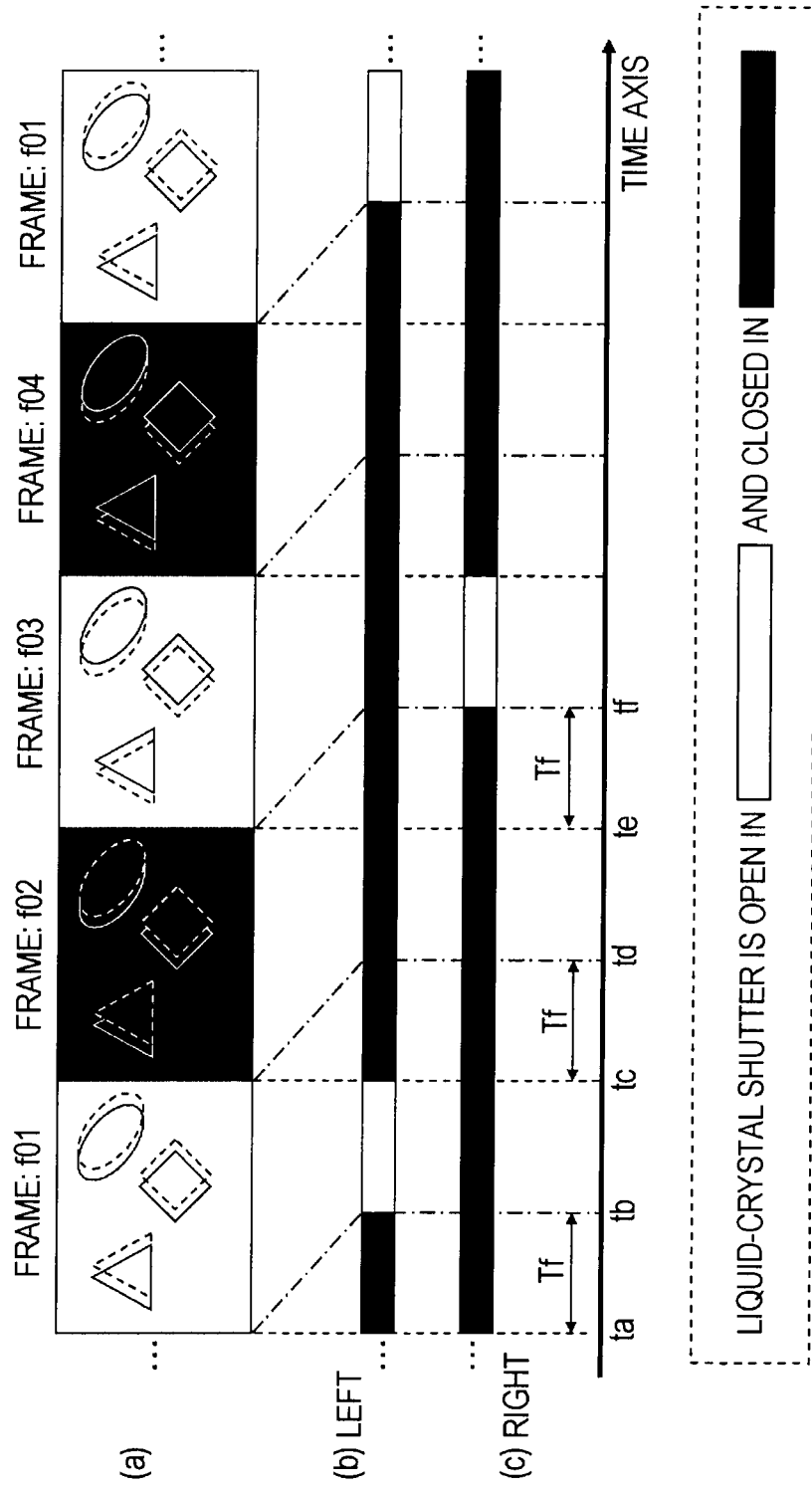
FIG. 13 is a diagram describing an image display sequence and a shutter-of-glasses control sequence in the embodiment of the present invention.

FIG. 13 is a control sequence that takes into consideration the frame display transition period (Tf) corresponding to the previous second embodiment. As in FIG. 12, FIG. 13 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

The frame f01 is an image for the left eye. The frame f02 is an inverted image of the image f01 for the left eye. The frame f03 is an image for the right eye. The frame f04 is an inverted image of the image f03 for the right eye. In FIG. 13, as in FIG. 12, all the shutters of the glasses for 3D image observation are set to be closed in the display transition period (Tf) of each frame. By executing such control, an observer who is wearing glasses for 3D image observation observes no image at all in the display transition period (Tf) of each frame. As a result, an observer who is wearing glasses for 3D image observation observes, with the respective eyes, only the frames f01 and f03 corresponding to a 3D image, without observing the inverted image frames f02 and f04, thereby perceiving only a 3D image.

However, in the case of the control sequences illustrated in FIG. 12 and FIG. 13, the amount of light entering an observer who is wearing glasses for 3D image observation is reduced. That is, since a period in which one of the shutters for both the left and right eyes is completely open is too short, an observer who is wearing the glasses feels darkness unless the display luminance of the display is considerably increased. An example of a process for solving this problem will be described with reference to FIG. 14.

Figure 14:
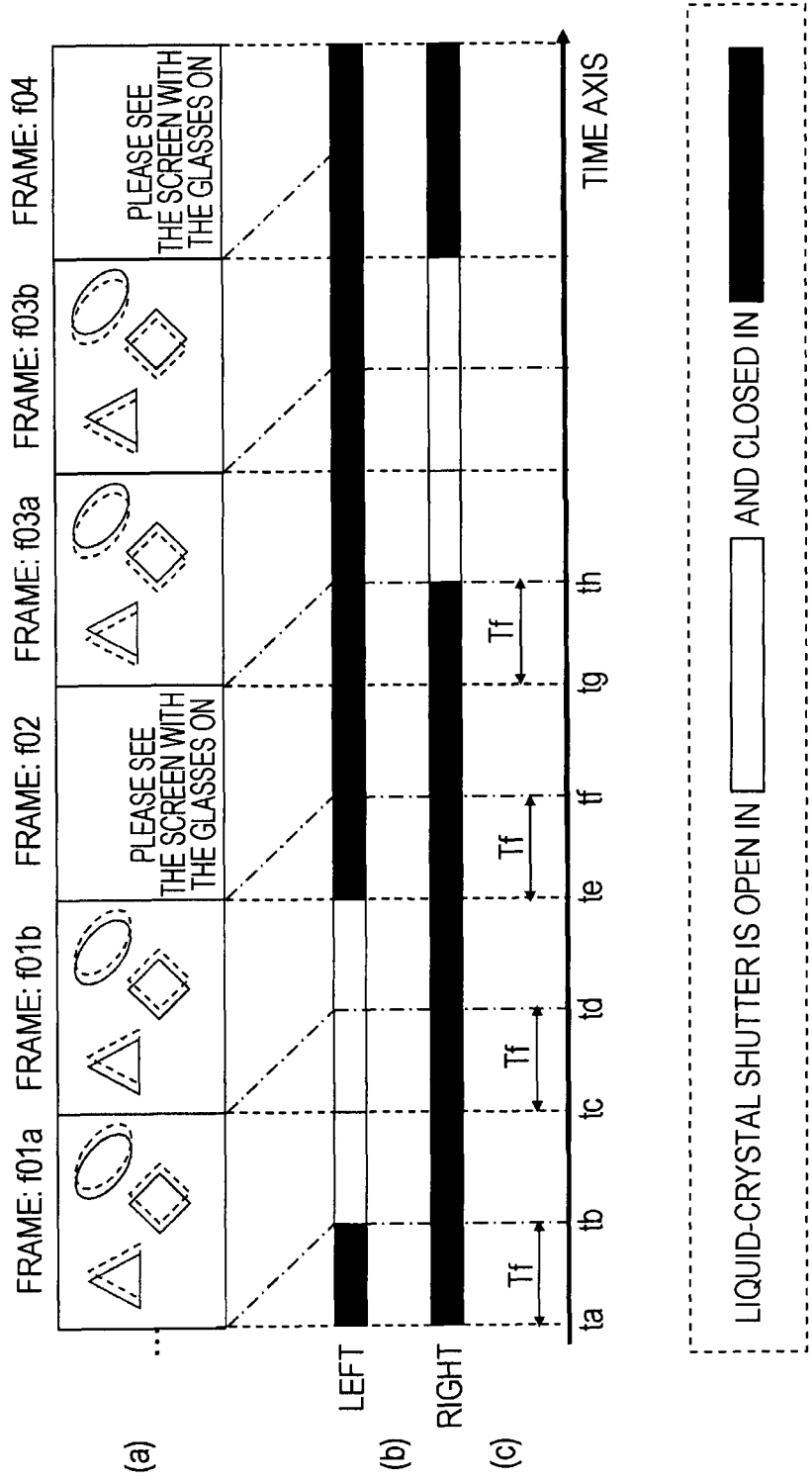
FIG. 14 is a diagram describing an image display sequence and a shutter-of-glasses control sequence in the embodiment of the present invention.

As in FIG. 12, FIG. 14 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

The control sequence in FIG. 14 consecutively displays the frame f01a and the frame f01b which have the same image for the left eye in a display period of two frames, and thereafter displays the frame f02 including the additional information "please see the screen with the glasses on" only in a display period of one frame. Further, thereafter, the display sequence consecutively displays the frame f03a and the frame f03b which have the same image for the right eye in a display period of two frames, and thereafter displays the frame f04 including the additional information only in a display period of one frame. This processing is repeated.

The shutter control of the glasses for 3D image observation causes, as illustrated in FIGS. 14(b) and (c), all of the shutters to be in a closed state at the time of switching a frame image (from f01 to f02, from f02 to f03, or the like). This processing is the same as the shutter control sequence described with reference to FIG. 12. However, in the control sequence illustrated in FIG. 14, one of the shutters is opened in a display period of frames including the same image, such as in a period of the frames f01a and f01b, and a period of the frames f03a and f03b. Therefore, an image can be observed for a longer time than that in the previous example illustrated in FIG. 12, and accordingly, incident light increases. As a result, the observer can observe a 3D image without feeling a reduction in luminance.

Figure 15:
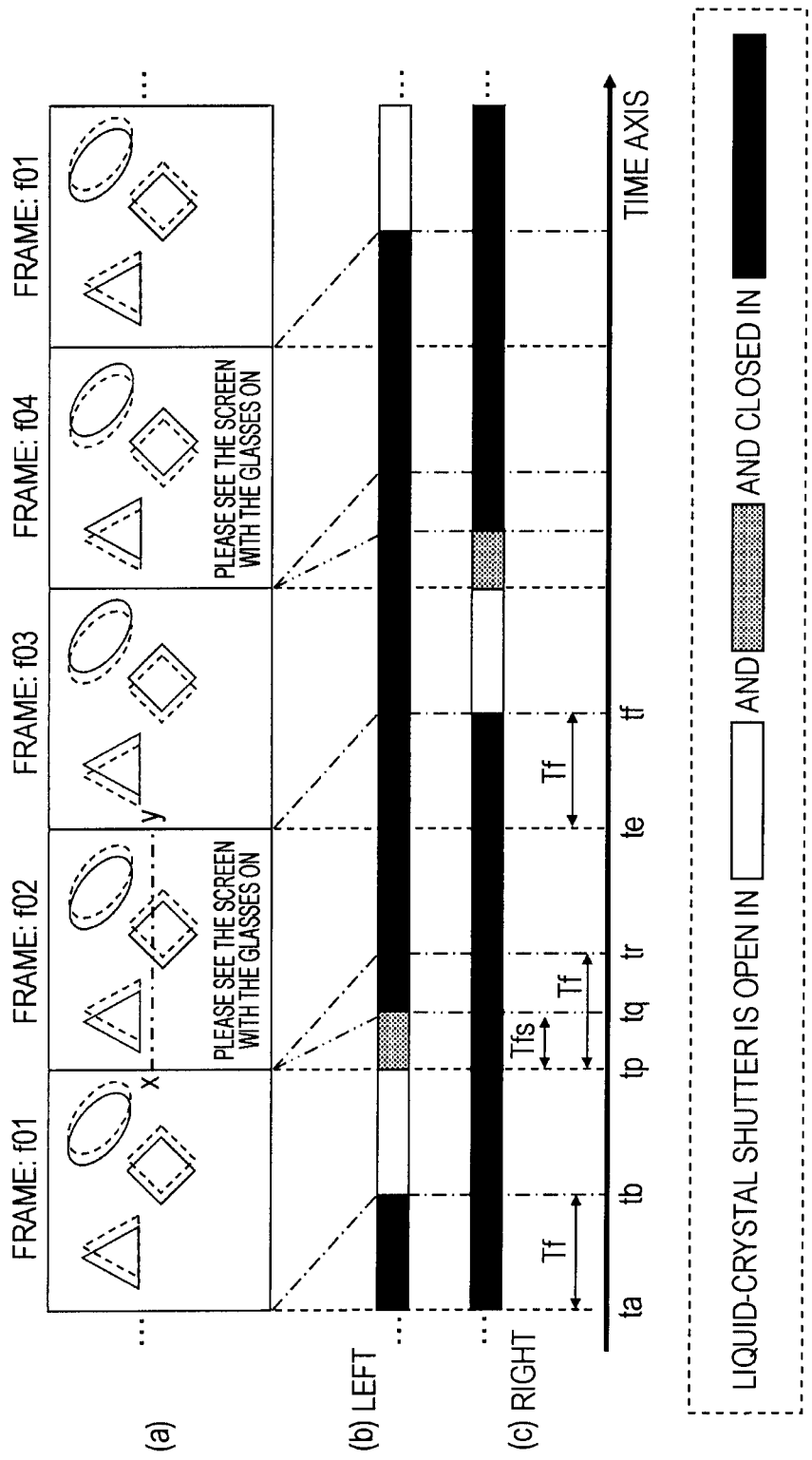
FIG. 15 is a diagram describing an image display sequence and a shutter-of-glasses control sequence in the embodiment of the present invention.

FIG. 15 is a diagram illustrating a screen switching and shutter control sequence that disables, by using the fact that a display region of a message serving as additional information is at the bottom of the screen, a person who is wearing glasses for 3D image observation from observing the message serving as the additional information, and that avoids reduction in luminance. The frame f02 or f04 illustrated in FIG. 15 is constructed as a multiplexed information image frame in which the additional information is added to an image constituting an image frame for the left eye or an image frame for the right eye.

FIG. 15 also illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses; and (c) the timing of opening/closing the liquid-crystal shutter for the right eye of the liquid-crystal shutter glasses.

Also, in the example illustrated in FIG. 15, image frames are as follows:

frame f01=an image for the left eye;

frame f02=a multiplexed information image in which additional information (message) is added to the image for the left eye;

frame f03=an image for the right eye; and frame f04=a multiplexed information image in which additional information (message) is added to the image for the right eye.

Shutter control of the glasses for 3D image observation is set as illustrated in FIGS. 15(b) and (c). For example, the closing timing of the shutter for the left eye is delayed at the time of switching from the frame f01 to the frame f02. In the example described with reference to FIG. 12, the shutter for the left eye is closed at the time at which display of the frame f02 is started. In the example illustrated in FIG. 15, the time at which the shutter for the left eye is closed is not set to the time (tp) at which display of the frame f02 is started, but is set to time tq at which a certain time [Tfs] has elapsed after display of the frame f02 is started.

The shutter for the left eye is in an open state in the period of Tfs=tp~tq. However, the frame f02 displayed in the period of tp~tq is only the upper half above the xy line of the frame f02 illustrated in FIG. 15(a). Frame switching of the lower half is not completed yet, and the lower half of the frame f01 remains displayed. That is, this is the state in which a message at the bottom of the frame f02 is not displayed.

Therefore, the image for the left eye, which is the same as the frame f01, is observed by the left eye of an observer who is wearing glasses for 3D image observation over a period of tp~tq indicated in the time axis of FIG. 15. By performing such control, a reduction in luminance can be avoided, and it can be set to disable observation of the additional information (message). Note that a period in which the shutter for the right eye is open is also extended at the time of switching from the frame f03 including the image for the right eye to the frame f04, thereby performing processing to avoid a reduction in luminance.

Note that the example illustrated in FIG. 15 is an example in which the message as the additional information is set at the bottom of the screen. In this case, a reduction in luminance is avoided by extending a shutter open state to a subsequent frame side. For example, when the message as the additional information is set at the top of the screen, if a shutter open state is set to be extended to the start side of frame switching, similarly a process of avoiding a reduction in luminance can be performed.

5. Regarding an Example of the Configuration of an Image Display Apparatus and Glasses for 3D Image Observation of the Present Invention Next, an example of the configuration of an image display apparatus and glasses for 3D image observation will be described with reference to FIG. 16 and so forth.

Figure 16:
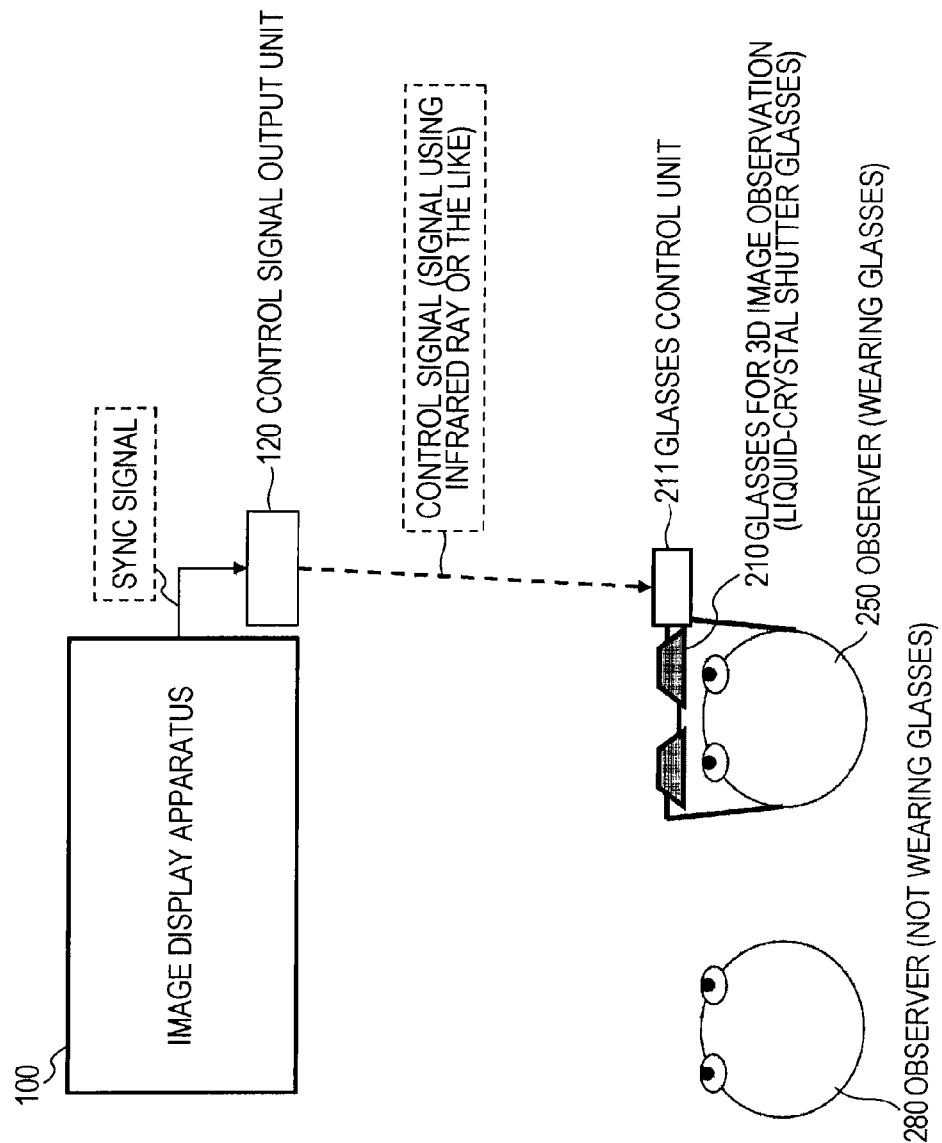
FIG. 16 is a diagram describing an example of the configuration of an image display apparatus and glasses for 3D image observation according to an embodiment of the present invention.

FIG. 16 is a diagram illustrating the overall configuration of an image display apparatus and glasses for 3D image observation of the present invention. Images constituting the frames f01 to f04 described in the above-descried first to third embodiments are displayed on an image display apparatus 100. The image display apparatus 100 includes a control signal output unit 120. The control signal output unit 120 outputs a shutter open/close control signal to glasses for 3D image observation 210 worn by an observer 250 in accordance with a sync signal such as a display image (frame) switching timing of the image display apparatus 100.

Note that outputting of a shutter open/close control signal is executed in various embodiments in accordance with various examples in the previously described first to third embodiments. A control signal may be output via cable or wirelessly. For example, an infrared signal can be used in the case of a wireless signal.

It is assumed that, as an observer of a display image of the image display apparatus 100, there are the observer 250 who is wearing the glasses for 3D image observation 210 and an observer 280 who is not wearing the glasses for 3D image observation 210. The glasses for 3D image observation 210 worn by the observer 250 include a glasses control unit 211. The glasses control unit 211 receives a control signal output by the control signal output unit 120, and executes opening/closing control of the left and right shutters (e.g., liquid-crystal shutters) of the glasses for 3D image observation 210 in accordance with the control signal. Opening/closing control is performed in accordance with various settings in the previously described first to third embodiments.

Figure 17:
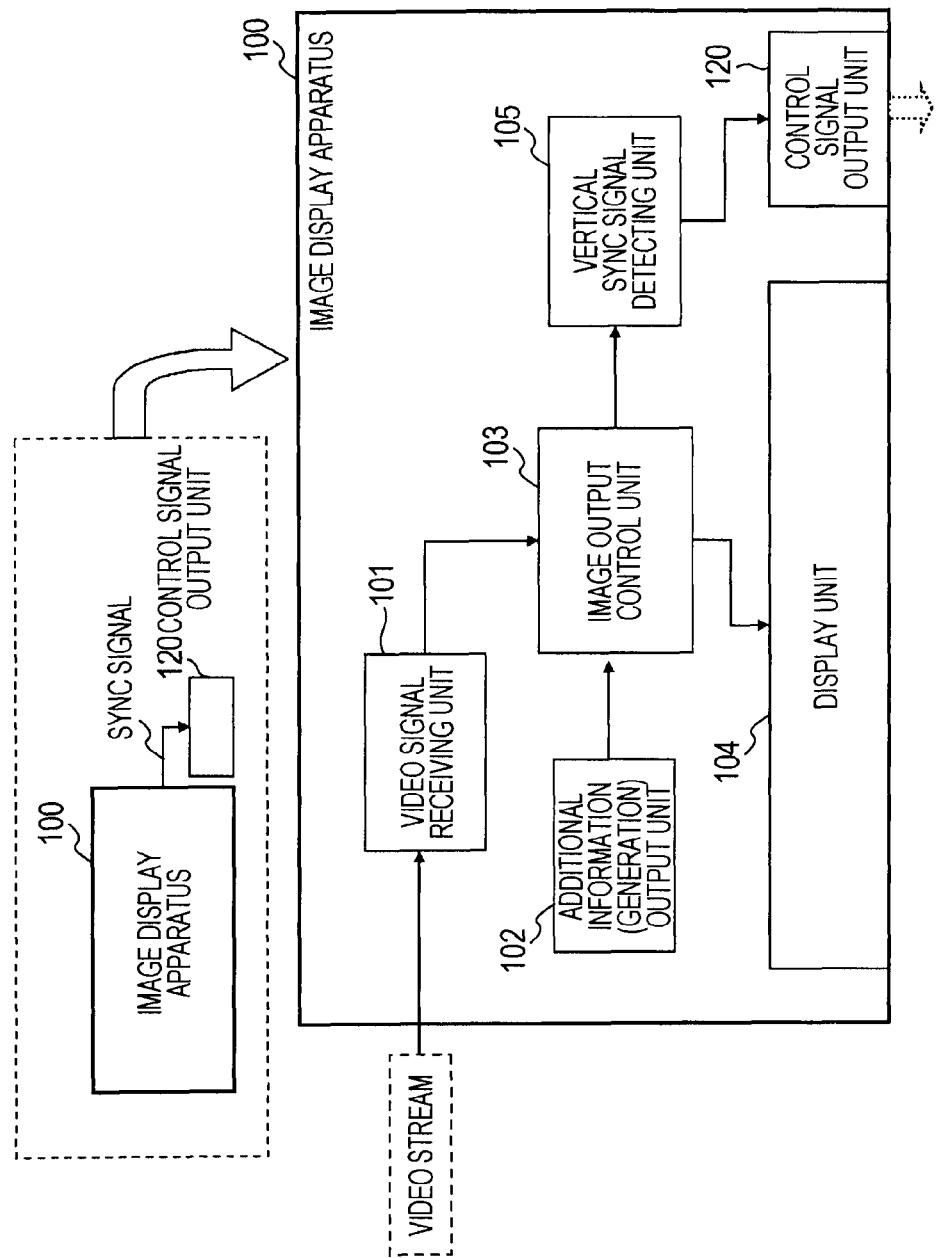
FIG. 17 is a diagram describing an example of the configuration of the image display apparatus according to the embodiment of the present invention.

FIG. 17 is a diagram illustrating the main configuration of the image display apparatus 100. Note that the example illustrated in FIG. 17 is an example of the configuration in which the control signal output unit 120 is included in the image display apparatus 100. The image display apparatus 100 includes a video signal receiving unit 101, an additional information (generation) output unit 102, an image output control unit 103, a display unit 104, a vertical sync signal detecting unit 105, and the control signal output unit 120. Note that FIG. 17 only illustrates the main configuration of the image display apparatus 100, and the image display apparatus 100 includes, besides these units, for example, a memory that stores a program and parameters, a control unit including a CPU serving as a program executing unit, and the like.

The video signal receiving unit 101 receives a video signal including a 3D image via, for example, a broadcasting wave, a network such as the Internet, or a medium such as a DVD, and outputs the video signal to the image output control unit 103. Note that a video signal is an image in which, for example, images for the left and right eyes using the time-division method are alternately set.

The additional information (generation) output unit 102 generates, for example, an image including the message "please see the screen with the glasses on" serving as additional information described in the previous first embodiment, an additional information frame including an inverted image described in the second embodiment, an image frame including disturbance information for an image frame for the left eye or an image frame for the right eye, or the like, and outputs the generated image or frame to the image output control unit 103. Note that the configuration can be such that an image frame including generated additional information is stored in advance in a memory, and the additional information (generation) output unit 102 takes out the image frame including the additional information from the memory and outputs the image frame including the additional information to the image output control unit 103.

Note that, when video data in which an additional information frame is inserted in a 3D image frame is provided by a broadcasting station or is recorded on a medium, the video signal receiving unit 101 can receive the video data in which the additional information is inserted in the 3D image frame. In this case, processing performed by the additional information (generation) output unit 102 is unnecessary.

The image output control unit 103 sets the input image frames from the video signal receiving unit 101 or from the video signal receiving unit 101 and the additional information (generation) output unit 102 to a certain sequence, and outputs the input image frames to the display unit 104. That is, the image output control unit 103 generates or receives an image frame sequence in which an additional information image frame including additional information is added between an image frame for the left eye and an image frame for the right eye, and outputs the image frame sequence to the display unit 104. The display unit 104 displays the image frame sequence output by the image output control unit 103.

Specifically, the image output control unit 103 sets the frames f01 to f04 described in the previous first to third embodiments in an order in accordance with the specific examples described in the individual embodiments, and outputs the frames f01 to f04. The display unit 104 executes image display in the sequence controlled by the image output control unit 103. Displayed images are images in which the frames constituting the 3D image and the additional information image frame are set to the certain sequence, as described in the previous first to third embodiments.

Note that, when the additional information image frame is a multiplexed information image frame in which additional information is added to an image constituting an image frame for the left eye or an image frame for the right eye, such as that illustrated in FIG. 15, the image output control unit 103 generates a multiplexed information image frame based on input information from the video signal receiving unit 101 and the additional information (generation) output unit 102.

The vertical sync signal detecting unit 105 detects a vertical sync signal in accordance with the timing of frame switching executed by the image output control unit 103, and outputs the vertical sync signal to the control signal output unit 120.

The control signal output unit 120 outputs a control signal for the glasses for 3D image observation at a preset timing in accordance with the vertical sync signal input from the vertical sync signal detecting unit 105.

The control signal output unit 120 outputs, for example, the following control signals:

a control signal that sets only a shutter for the left eye to an open state at a display timing of an image frame for the left eye for the display unit 104;

a control signal that sets only a shutter for the right eye to an open state at a display timing of an image frame for the right eye for the display unit 104; and a control signal that sets the shutters for both the left and right eyes to a closed state at a display timing of an additional information image frame for the display unit 104.

The control signal output unit 120 outputs these control signals. Note that specific examples of the control signals will be described later with reference to FIG. 19.

Figure 18:
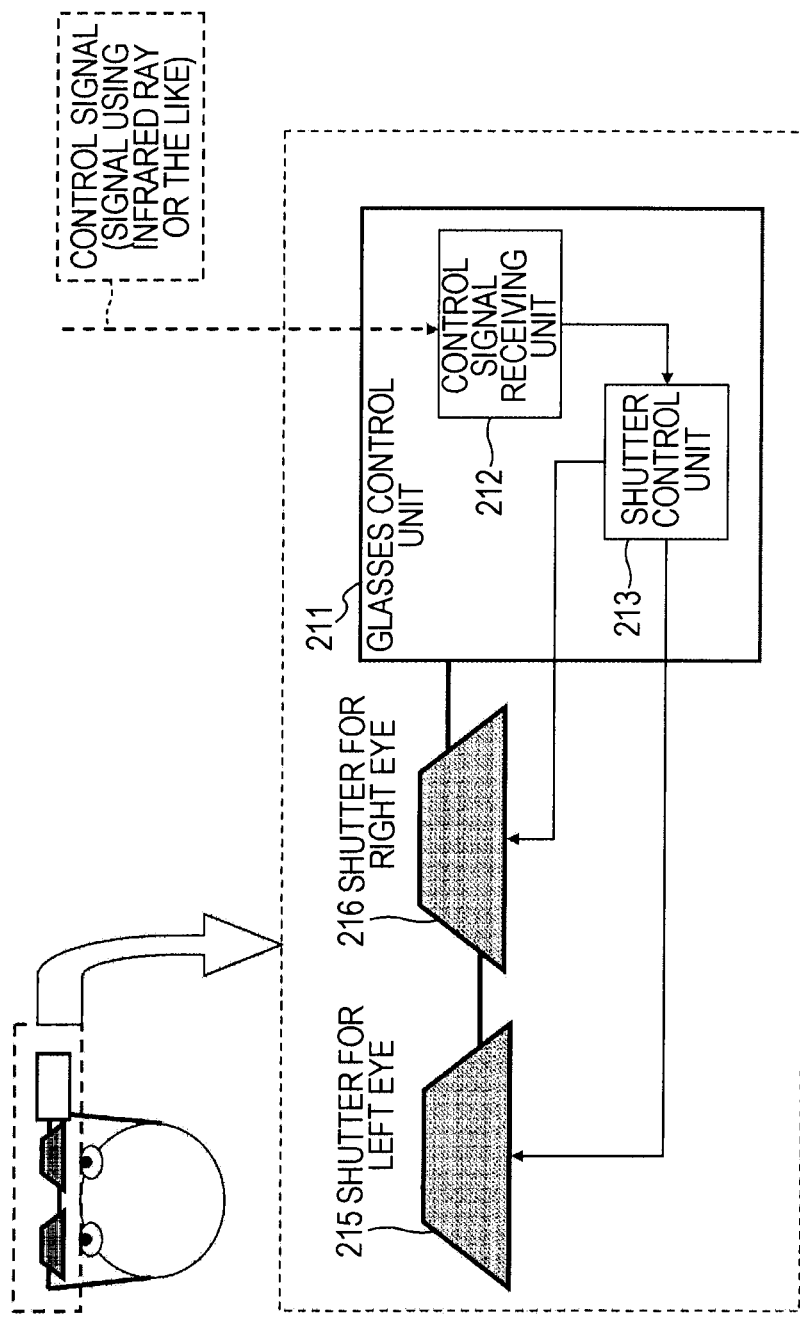
FIG. 18 is a diagram describing an example of the configuration of the glasses for 3D image observation according to the embodiment of the present invention.

Next, an example of the configuration of the glasses for 3D image observation side will be described with reference to FIG. 18. As illustrated in FIG. 18, the glasses for 3D image observation include the glasses control unit 211, a shutter for the left eye 215, and a shutter for the right eye 216. The glasses control unit 211 includes a control signal receiving unit 212 and a shutter control unit 213.

The control signal receiving unit 212 in the glasses control unit 211 receives control signals output by the control signal output unit 120 at the image display apparatus 100 side. Examples of control signals will be described with reference to FIG. 19. Control signals include, for example, as illustrated in FIG. 19, four types of 2-bit signals 00, 01, 10, and 11.

The example illustrated in FIG. 19 is an example in which the individual control signals are set to execute the following control:

control signal=00: close the shutter for the left eye and close the shutter for the right eye;

control signal=01: open the shutter for the left eye and close the shutter for the right eye;

control signal=10: close the shutter for the left eye and open the shutter for the right eye; and control signal=11: open the shutter for the left eye and open the shutter for the right eye.

When the control signal receiving unit 212 in the glasses control unit 211 illustrated in FIG. 18 receives any of these control signals 00 to 11 from the control signal output unit 120 at the image display apparatus 100 side, the control signal receiving unit 212 outputs a shutter open/close command in accordance with the control signal to the shutter control unit 213. The shutter control unit 213 controls the shutter for the left eye 215 and the shutter for the right eye 216 in accordance with the command input from the control signal receiving unit 212, and performs processing to set the shutter for the left eye 215 and the shutter for the right eye 216 to respective shutter states in accordance with the control signal.

Figure 20:
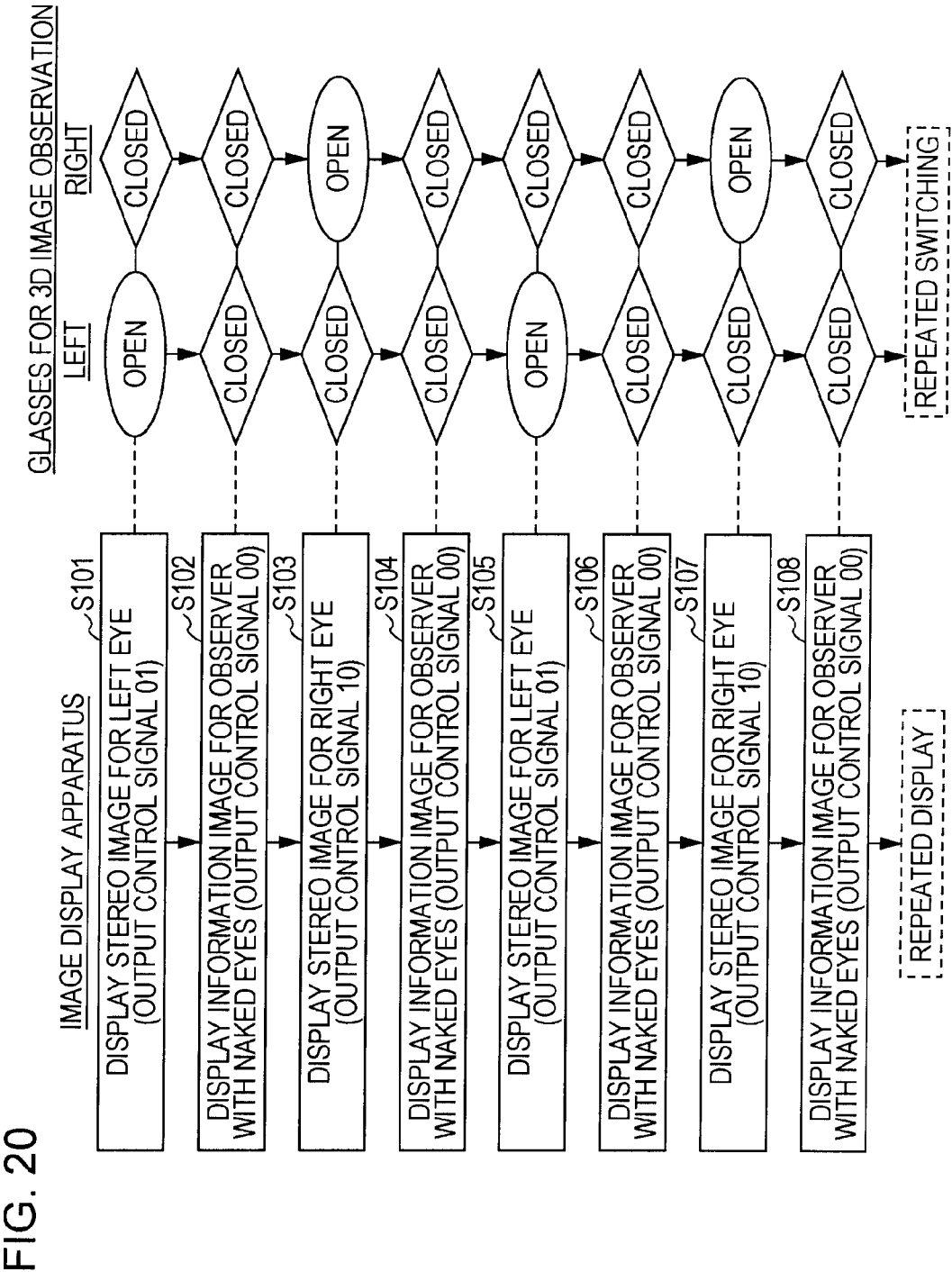
FIG. 20 is a diagram describing processing sequences of the image display apparatus and the glasses for 3D image observation according to the embodiment of the present invention.

Various types of shutter control described in the previous first to third embodiments are executed using these control signals. An example of the sequence of image display of the image display apparatus, control signal transfer, and shutter control will be described with FIG. 20. In FIG. 20, a processing sequence at the image display apparatus side is illustrated at the left side, and a shutter control sequence of the glasses for 3D image observation is illustrated at the right side.

The image display apparatus displays an image for the left eye constituting a 3D image under control of the image output control unit in step S101. Further, the control signal output unit outputs a control signal (01). This control signal is received by the control signal receiving unit of the glasses for 3D image observation, and shutter control in accordance with the control signal (01) is performed. In this case, processing to open the shutter for the left eye and to close the shutter for the right eye is performed.

Next, the image display apparatus displays an additional information image frame under control of the image output control unit in step S102. Further, the control signal output unit outputs a control signal (00). This control signal is received by the control signal receiving unit of the glasses for 3D image observation, and shutter control in accordance with the control signal (00) is performed. In this case, processing to close both the shutter for the left eye and the shutter for the right eye is performed.

Next, the image display apparatus displays an image for the right eye constituting the 3D image under control of the image output control unit in step S103. Further, the control signal output unit outputs a control signal (10). This control signal is received by the control signal receiving unit of the glasses for 3D image observation, and shutter control in accordance with the control signal (10) is performed. In this case, processing to close the shutter for the left eye and to open the shutter for the right eye is performed.

Next, the image display apparatus displays an additional information image frame under control of the image output control unit in step S104. Further, the control signal output unit outputs a control signal (00). This control signal is received by the control signal receiving unit of the glasses for 3D image observation, and shutter control in accordance with the control signal (00) is performed. In this case, processing to close both the shutter for the left eye and the shutter for the right eye is performed.

Steps S105 to S108 are repetitions of steps S101 to S104. Thereafter, similar processing is repeatedly executed.

With this control sequence, an observer who is wearing glasses for 3D image observation observes, with the left eye, an image for the left eye constituting a 3D image, and, observes, with the right eye, an image for the right eye, thereby perceiving a stereoscopic image.

In contrast, an observer who is not wearing glasses for 3D image observation observes, with both eyes, an image for the left eye and an image for the right eye constituting a 3D image, and further observes an additional information image frame, thereby observing a sum image of all the images because of the integral effect. As a result, in the example in the first embodiment, the message "please see the screen with the glasses on" serving as additional information can be checked. Also, when the inverted images described in the second embodiment are set as additional information, a gray image is recognized as a close image.

Note that the control sequence illustrated in FIG. 20 indicates the simplest control sequence. To execute image switching and shutter control described in the first to third embodiments, it is necessary to perform control by transferring control signals in a sequence in accordance with the individual processing embodiments in the above-described embodiments.

Settings and issuing timings of control signals in the case where control in accordance with the control sequence illustrated in FIG. 15 described in the third embodiment, which is one of the complicated examples in the above-described embodiments, is performed will be described with reference to FIG. 21.

Figure 21:
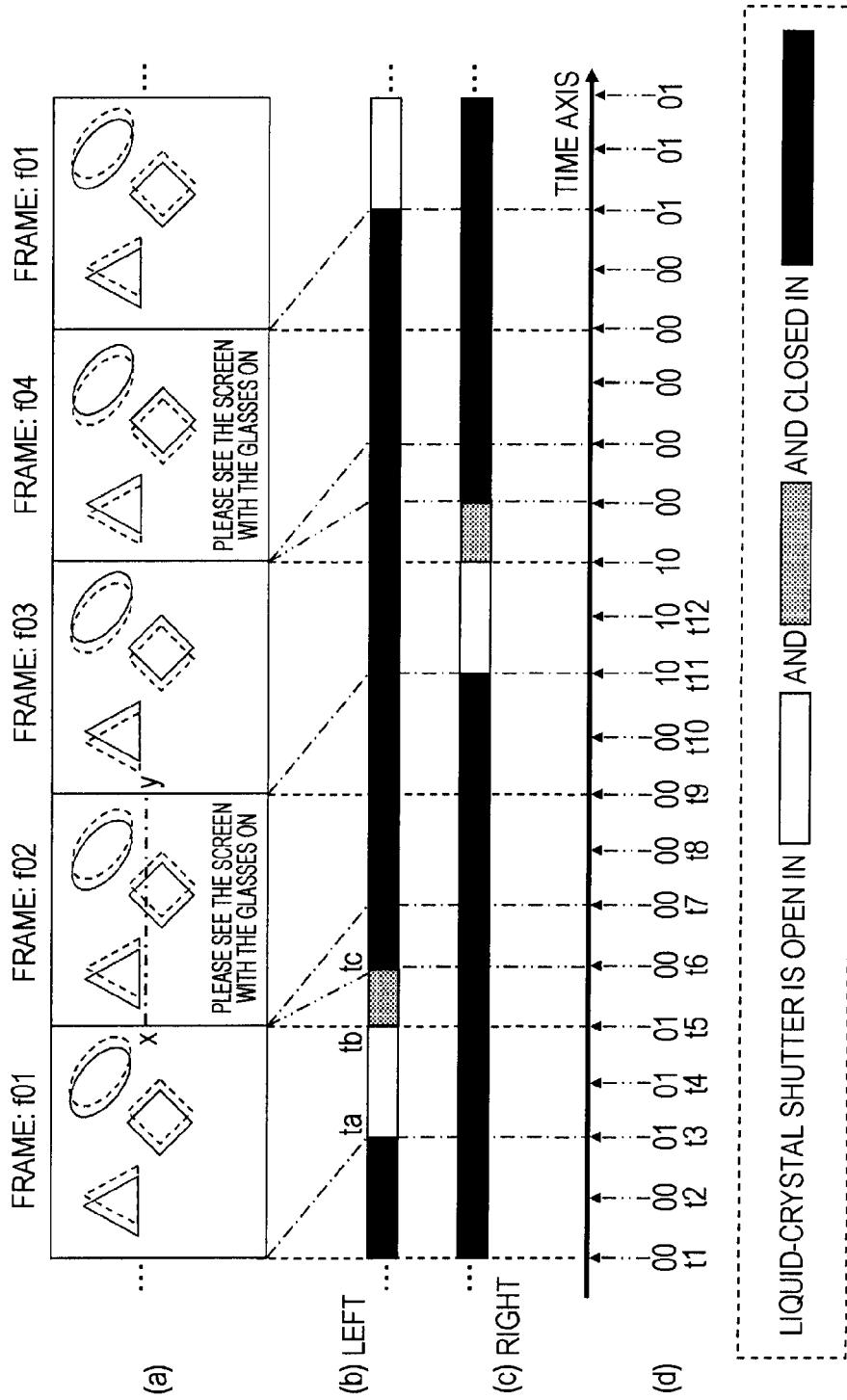
FIG. 21 is a diagram describing an example of the configuration of an image display apparatus and glasses for 3D image observation according to an embodiment of the present invention.

FIG. 21 is a diagram illustrating a screen switching and shutter control sequence that disables, by using the fact that a display region of a message serving as additional information is at the bottom of the screen, a person who is wearing glasses for 3D image observation from observing the message serving as the additional information, and that avoids reduction in luminance. The frame f02 or f04 illustrated in FIG. 21 is constructed as a multiplexed information image frame in which the additional information is added to an image constituting an image frame for the left eye or an image frame for the right eye.

FIG. 21 illustrates the progression of time from left to right, and the following are illustrated:

(a) the sequence of switching the display image frames (f01 to f04) displayed on the image display apparatus;

(b) the timing of opening/closing the liquid-crystal shutter for the left eye of the liquid-crystal shutter glasses;

(c) the timing of opening/closing the liquid-crystal shutter for the right eye of the liquid-crystal shutter glasses; and (d) the sequence of outputting control signals from the image display apparatus to the glasses for 3D image observation.

Also, in the example illustrated in FIG. 21, image frames are as follows:

frame f01=an image for the left eye;

frame f02=a multiplexed information image in which additional information (message) is added to the image for the left eye;

frame f03=an image for the right eye; and frame f04=a multiplexed information image in which additional information (message) is added to the image for the right eye.

Shutter control of the glasses for 3D image observation is set as illustrated in FIGS. 21(*b*) and (*c*). For example, the closing timing of the shutter for the left eye is delayed at the time of switching from the frame f01 to the frame f02. The time at which the frame f01 is switched to the frame f02 is time tb. The time at which the shutter for the left eye is closed is set to time tc that is subsequent to this tb.

The shutter for the left eye is in an open state in the period of time ta~tc. Although frame switching is started at time tb, the frame f02 displayed in the period of tb~tc is only the upper half above the xy line of the frame f02 illustrated in FIG. 21(*a*). Frame switching of the lower half is not completed yet, and the lower half of the frame f01 remains displayed. That is, this is the state in which a message at the bottom of the frame f02 is not displayed. Therefore, the image for the left eye, which is the same as the frame f01, is observed by the left eye of an observer who is wearing glasses for 3D image observation over a period of ta~tc indicated in the time axis of FIG. 21.

The sequence of outputting control signals from the image display apparatus to the glasses for 3D image observation in the case where such control is performed is the sequence illustrated in FIG. 21(d). Note that, in this example, control signals indicate an example where sending and reception are performed at a frequency four times as high as the frame switching. That is, control signal transfer processing is performed four times in a display period of one frame in the image display apparatus.

At a display start time [t1] of the frame f01, the image display apparatus outputs a control signal [00] to the glasses. The control signal [00] is a control signal that sets the shutters for the left and right eyes to a closed state.

Thereafter, the following control signals are output:
a control signal [00] at time [t2]; and
a control signal [01] at time [t3].

The control signal [01] at time [t3] is a control signal for setting the shutter for the left eye to an open state and the shutter for the right eye to a closed state. With control at the glasses side, processing to open the shutter for the left eye and to close the shutter for the right eye is executed.

Thereafter, the following control signals are output:
a control signal [01] at time [t4];
a control signal [01] at time [t5]; and
a control signal [00] at time [t6].

The control signal [00] at time [t6] is a control signal for setting the shutter for the left eye and the shutter for the right eye to a closed state. With control at the glasses side, processing to close the shutter for the left eye and the shutter for the right eye is executed.

Hereinafter, as illustrated in FIG. 21(d), any of the control signals 00 to 11 is output from the image display apparatus to the glasses side at every certain timing, and, with the control signal, opening/closing control of each shutter is executed at the sequence illustrated in FIG. 21(b) and (c).

The shutter control described in the other embodiments can be realized by, as in the description with reference to FIG. 21, transferring control signals for setting different shutter states from the image display apparatus to the glasses and performing opening/closing control of the shutters in accordance with the control signals.

Note that the control signal output unit 120 in the image display apparatus 100 illustrated in FIG. 17 basically outputs the following control signals, as described previously:

a control signal that sets only the shutter for the left eye to an open state at a display timing of an image frame for the left eye for the display unit 104;

a control signal that sets only the shutter for the right eye to an open state at a display timing of an image frame for the right eye for the display unit 104; and a control signal that sets the shutters for both the left and right eyes to a closed state at a display timing of an additional information image frame for the display unit 104.

The control signal output unit 120 outputs these control signals.

However, when the control signal output unit 120 performs, for example, control illustrated in FIG. 5 or FIG. 6, the control signal output unit 120 outputs, prior to a display start time of an additional information image frame for the display unit 104, a control signal that sets the shutters for both the left and right eyes to a closed state, and outputs, prior to a display end time of the additional information image frame for the display unit 104, a control signal that sets only one of the shutters for the left and right eyes to a closed state. These control signal output timings are determined using a frame display period or the like calculated by adopting a sync signal input from the vertical sync signal detecting unit 105.

Also, for example, in the third embodiment, as described with reference to FIG. 12 to FIG. 15, when processing that takes into consideration a frame transition period is performed, the control signal output unit 120 outputs a control signal that sets only one of the shutters for the left and right eyes to a closed state, at the time at which a display transition period from the additional information image frame for the display unit 104 to the next display frame ends.

Also, when the additional information image frame is constructed as a multiplexed information image frame in which additional information is added to an image constituting an image frame for the left eye or an image frame for the right eye as illustrated in FIG. 15, the control signal output unit 120 performs processing to control an output timing of a control signal so that the additional information will not be input to any of the left and right eyes of an observer via the glasses for 3D image observation, in accordance with an additional information setting position of the multiplexed information image frame.

6. An Example of Processing Corresponding to Two-Dimensional Image Information

Fourth Embodiment

In the above-described embodiments, the examples have been described in which an observer who is wearing glasses for 3D image observation observes a three-dimensional image displayed on the image display apparatus, and an observer who is not wearing glasses for 3D image observation observes additional information different from the three-dimensional image displayed on the image display apparatus.

However, in the configuration of the present invention, it is not essential that an image displayed on the image display apparatus be a 3D (three-dimensional) image. For example, the configuration is possible in which an image displayed on the image display apparatus is a 2D (two-dimensional) image; and an observer who is wearing glasses for 3D image observation observes the two-dimensional image displayed on the image display apparatus, and an observer who is not wearing glasses for 3D image observation observes additional information different from the two-dimensional image displayed on the image display apparatus.

An example of such processing will be described as a fourth embodiment with reference to FIG. 22 and so forth.

Figure 22:
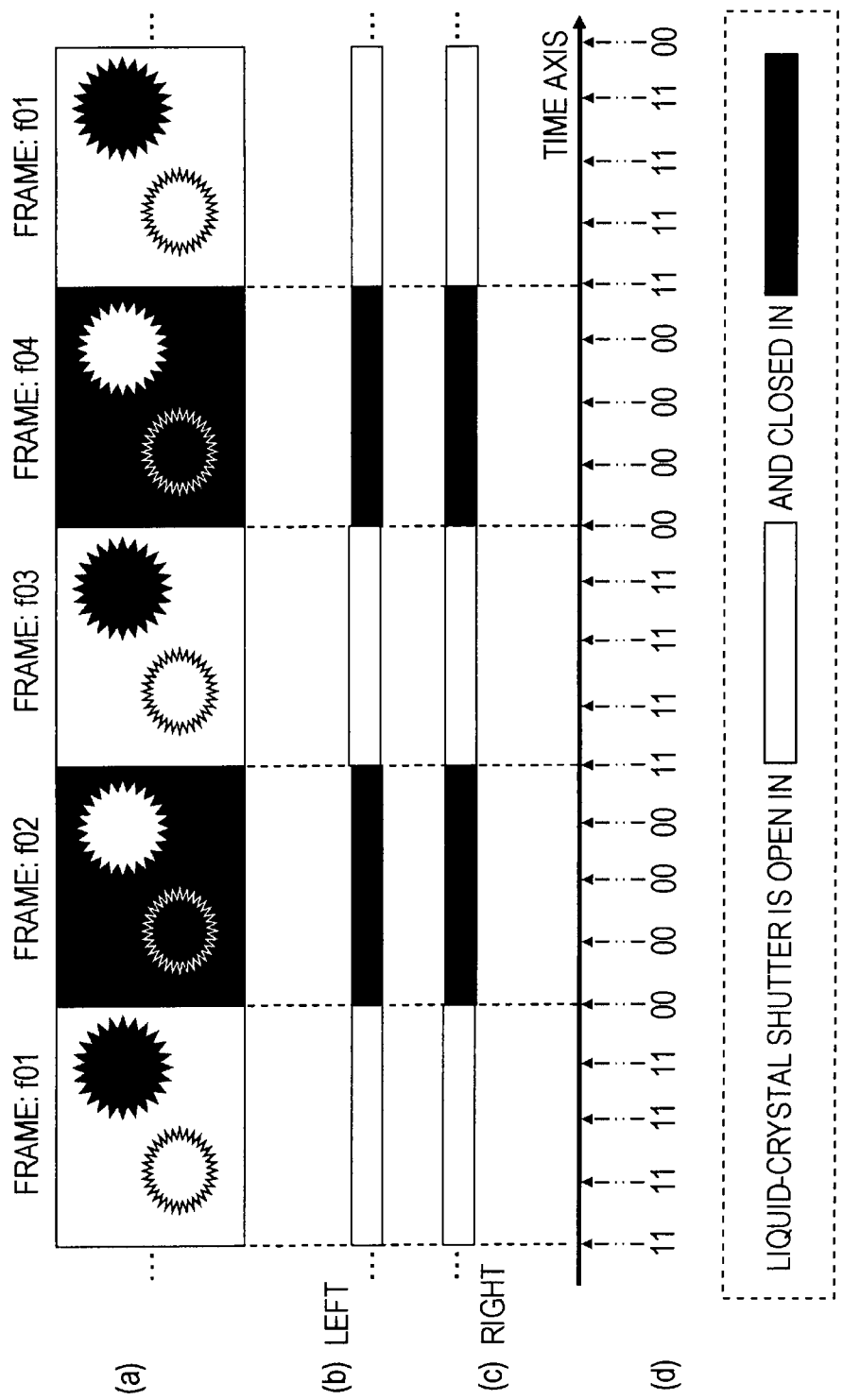
FIG. 22 is a diagram describing an example of the configuration of an image display apparatus and glasses for 3D image observation according to an embodiment of the present invention.

FIG. 22 illustrates the progression of time from left to right, and the following are illustrated:

(a) the sequence of switching display image frames (f01 to f04) displayed on the image display apparatus;

(b) the timing of opening/closing the liquid-crystal shutter for the left eye of the liquid-crystal shutter glasses;

(c) the timing of opening/closing the liquid-crystal shutter for the right eye of the liquid-crystal shutter glasses; and (d) the sequence of outputting control signals from the image display apparatus to the glasses for 3D image observation.

Also, in the example illustrated in FIG. 22, the frames f01 and f03 are normal two-dimensional images. The frame f02 is a frame including an inverted image of the frame f01. Also, the frame f04 is a frame including an inverted image of the frame f03. These display frames f01 to f04 are repeatedly displayed.

Control signals to be sent to glasses for 3D image observation are, as illustrated in FIG. 22(d), a control signal [11], i.e., a control signal that sets the left and right shutters to an open state, in a display period of the frames f01 and f03, which are the normal two-dimensional image frames, and a control signal [00], i.e., a control signal that sets the left and right shutters to a closed state, in a display period of the frames f02 and f04, which are the inverted image frames.

As a result, an observer who is wearing glasses for 3D image observation observes, with both eyes, only the frames f01 and 03, which are the normal two-dimensional image frames.

In contrast, an observer who is not wearing glasses for 3D image observation observes, with both eyes, not only the frames f01 and f03, which are the normal two-dimensional image frames, but also f02 and f04, which are the inverted image frames. That is, the observer continuously observes, with both eyes, the frames f01 to f04.

In FIG. 23, perception images of an observer who is not wearing glasses for 3D image observation and an observer who is wearing glasses for 3D image observation are illustrated.

FIG. 23(a) is a perception image of an observer 311 who is not wearing glasses for 3D image observation.

FIG. 23(b) is a perception image of an observer 351 who is wearing glasses for 3D image observation 353.

An image display apparatus 400 repeatedly displays the same video image, that is, the frames f01 to f04 illustrated in FIG. 22. The observer 351 who is wearing the glasses for 3D image observation 353 observes, with both eyes, only the frames f01 and f03, which are the normal two-dimensional image frames. Thus, the observer 351 can normally view a normal two-dimensional image.

In contrast, the observer who is not wearing glasses for 3D image observation observes, with both eyes, not only the frames f01 and f03, which are the normal two-dimensional image frames, but also f02 and f04, which are the inverted image frames. The observer perceives an image in which the entire screen is gray, which is the integral result image in which the frames f01 to f04 are added.

As described above, according to the present invention, the system can be constructed which enables, not only in the case where display content is 3D image content, but as is the case with scramble processing of, for example, pay content or the like, only a legitimate user who has legitimate glasses for 3D image observation to appreciate content, and disables a user who does not have glasses for 3D image observation from appreciating content.

Note that, although the first embodiment to the fourth embodiment have been sequentially described, a configuration including an appropriate combination of any of these individual embodiments is possible. For example, the configuration of the fourth embodiment can be included in various combinations, such as the configuration that sets a display period of image frames different from an additional information frame described in the other embodiments to a longer period, or the configuration that additionally uses shutter control that takes into consideration a frame transition period.

The present invention has been described in detail above with reference to the specific embodiments. However, it is apparent to those skilled in the art that corrections or substitutions may be made to the embodiments without departing from the gist of the present invention. That is, the invention has been disclosed with reference to the embodiments, which are intended to be illustrative only, and not to be limiting of the invention. In order to determine the gist of the present invention, the appended claims should be taken into account.

Also, the above-described series of processes described in the specification can be executed by hardware or software, or a combination of both. In the case where a process is executed by software, a program recording a processing sequence can be installed in a memory in a computer embedded in dedicated hardware and can be executed, or the program can be installed in a general computer capable of executing various processes and can be executed. For example, the program can be recorded in advance in a recording medium. Besides installing the program from the recording medium into a computer, the program can be received via a network such as a LAN (Local Area Network) or the Internet and can be installed in a recording medium such as a built-in hard disk.

Note that the various processes described in the specification can not only be executed time-sequentially according to the description, but also be executed in parallel or individually in accordance with the throughput of an apparatus that executes the processes, or as occasion calls. Also, a system in the present specification is a logical group configuration of multiple devices, and is not restricted to each component device being within the same housing.

INDUSTRIAL APPLICABILITY

As described above, according to the configuration of an embodiment of the present invention, an image display apparatus displays, on a display unit, an image frame sequence in which an additional information image frame including additional information is added between an image frame for the left eye and an image frame for the right eye, and, at a display timing of the additional information image frame for the display unit, outputs a control signal that sets shutters for both the left and right eyes of glasses for 3D image observation worn by an observer to a closed state. With this configuration, an observer who is wearing glasses for 3D image observation can observe a normal three-dimensional image, and a person who is not wearing the glasses can observe additional information such as a message prompting the person to wear the glasses.

REFERENCE SIGNS LIST 11 observer
21 observer
23 glasses for 3D image observation
30 image display apparatus
41 observer
51 observer
53 glasses for 3D image observation
100 image display apparatus
101 video signal receiving unit
102 additional information (generation) output unit
103 image output control unit
104 display unit
105 vertical sync signal detecting unit
120 control signal output unit
210 glasses for 3D image observation
211 glasses control unit
212 control signal receiving unit
213 shutter control unit
215 shutter for the left eye
216 shutter for the right eye
311 observer
351 observer
353 glasses for 3D image observation
400 image display apparatus

The invention claimed is:

1. An image display apparatus comprising:

an image output control unit that generates or receives an image frame sequence in which an additional information image frame including additional information is added between an image frame for a left eye and an image frame for a right eye, and that outputs the image frame sequence to a display unit;

the display unit which displays the image frame sequence output by the image output control unit; and a control signal output unit that outputs a control signal for opening/closing shutters for the left and right eyes of glasses for three-dimensional image observation worn by an observer, wherein the control signal output unit outputs a control signal that sets the shutters for both the left and right eyes to a closed state at a display timing of the additional information image frame for the display unit, and wherein the control signal output unit outputs a control signal that takes into consideration a frame display switching period such that the closing of the shutters is completed before the frame display switching period ends.

2. The image display apparatus according to claim 1, wherein the control signal output unit outputs a control signal that sets only the shutter for the left eye to an open state at a display timing of the image frame for the left eye for the display unit, and outputs a control signal that sets only the shutter for the right eye to an open state at a display timing of the image frame for the right eye for the display unit.

3. The image display apparatus according to claim 1, wherein the control signal output unit outputs a control signal that sets the shutters for both the left and right eyes to a closed state prior to a display start time of the additional information image frame for the display unit, and outputs a control signal that sets only the shutter for one of the left and right eyes to a closed state prior to a display end time of the additional information image frame for the display unit.

4. The image display apparatus according to claim 1, wherein the control signal output unit outputs a control signal that sets only the shutter for one of the left and right eyes to a closed state upon completion of a display transition period from the additional information image frame for the display unit to the next display frame.

5. The image display apparatus according to claim 1, wherein the image output control unit generates or receives an image frame sequence in which a display period of a plurality of image frames for the left eye including the same image and a display period of a plurality of image frames for the right eye including the same image are set to be longer than a display period of the additional information image frame, and outputs the image frame sequence to the display unit.

6. The image display apparatus according to claim 1, wherein the additional information image frame is a multiplexed information image frame in which the additional information is added to an image constituting the image frame for the left eye or the image frame for the right eye, and wherein the control signal output unit controls an output timing of a control signal, in accordance with an additional information setting position of the multiplexed information image frame, so that the additional information is not input to any of the left and right eyes of the observer via the glasses for three-dimensional image observation.

7. The image display apparatus according to claim 1, wherein the additional information image frame is an image frame including a message prompting a person to wear glasses for three-dimensional image observation.

8. The image display apparatus according to claim 1, wherein the additional information image frame is an inverted image frame of the image frame for the left eye or the image frame for the right eye.

9. The image display apparatus according to claim 1, wherein the additional information image frame is an image frame including disturbance information for the image frame for the left eye or the image frame for the right eye.

10. The image display apparatus according to claim 1, wherein the image frame for the left eye and the image frame for the right eye are image frames including a two-dimensional image, and wherein the control signal output unit outputs a control signal that sets the shutters for both the left and right eyes to an open state at a display timing of the image frame for the left eye or the image frame for the right eye for the display unit.

11. Glasses for image observation, comprising:

a control signal receiving unit that receives a control signal from an image display apparatus;

a shutter control unit that executes an opening/closing process of shutters for left and right eyes of glasses for three-dimensional image observation in accordance with the control signal received by the control signal receiving unit; and the shutters for the left and right eyes of the glasses for three-dimensional image observation which perform an opening/closing operation under control of the shutter control unit, wherein the control signal received by the control signal receiving unit includes a control signal that opens only one of the shutters corresponding to the left and right eyes of the glasses for three-dimensional image observation and a control signal that closes the shutters corresponding to both the left and right eyes, wherein the shutter control unit executes a process of opening only one of the shutters corresponding to the left and right eyes of the glasses for three-dimensional image observation or a process of closing the shutters corresponding to both the left and right eyes, and wherein the control signal takes into consideration a frame display switching period such that the closing of the shutters is completed before the frame display switching period ends.

12. An image display system comprising an image display apparatus and glasses for image observation, wherein the image display apparatus includes an image output control unit that generates or receives an image frame sequence in which an additional information image frame including additional information is added between an image frame for a left eye and an image frame for a right eye, and that outputs the image frame sequence to a display unit;

the display unit which displays the image frame sequence output by the image output control unit; and a control signal output unit that outputs a control signal for opening/closing shutters for the left and right eyes of glasses for three-dimensional image observation worn by an observer, wherein the control signal output unit is configured to output a control signal that sets the shutters for both the left and right eyes to a closed state at a display timing of the additional information image frame for the display unit, wherein the control signal output unit outputs a control signal that takes into consideration a frame display switching period such that the closing of the shutters is completed before the frame display switching period ends, wherein the glasses for image observation are glasses for three-dimensional image observation, and include a control signal receiving unit that receives a control signal from the image display apparatus;

a shutter control unit that executes an opening/closing process of the shutters for the left and right eyes of the glasses for three-dimensional image observation in accordance with the control signal received by the control signal receiving unit; and the shutters for the left and right eyes of the glasses for three-dimensional image observation which perform an opening/closing operation under control of the shutter control unit, and wherein the shutter control unit is configured to execute a process of opening only one of the shutters corresponding to the left and right eyes of the glasses for three-dimensional image observation or a process of closing the shutters corresponding to both the left and right eyes.

13. An image display control method executed by an image display apparatus, comprising:

an image output control step of generating or receiving, by an image output control unit, an image frame sequence in which an additional information image frame including additional information is added between an image frame for a left eye and an image frame for a right eye, and outputting the image frame sequence to a display unit;

a display step of displaying, by the display unit, the image frame sequence output by the image output control unit; and a control signal output step of outputting, by a control signal output unit, a control signal for opening/closing shutters for the left and right eyes of glasses for three-dimensional image observation worn by an observer, wherein the control signal output step includes the step of outputting a control signal that sets the shutters for both the left and right eyes to a closed state at a display timing of the additional information image frame for the display unit, and wherein the control signal output step includes the step of outputting a control signal that takes into consideration a frame display switching period such that the closing of the shutters is completed before the frame display switching period ends.

14. A non-transitory, computer-readable medium comprising instructions that cause an image display apparatus to execute image display control, comprising:

an image output control step of causing an image output control unit to generate or receive an image frame sequence in which an additional information image frame including additional information is added between an image frame for a left eye and an image frame for a right eye, and to output the image frame sequence to a display unit;

a display step of causing the display unit to display the image frame sequence output by the image output control unit; and a control signal output step of causing a control signal output unit to output a control signal for opening/closing shutters for the left and right eyes of glasses for three-dimensional image observation worn by an observer, wherein the control signal output step includes the step of causing a control signal that sets the shutters for both the left and right eyes to a closed state to be output at a display timing of the additional information image frame for the display unit, and wherein the control signal output step includes the step of outputting a control signal that takes into consideration a frame display switching period such that the closing of the shutters is completed before the frame display switching period ends.

* * * * *